US009972171B2

(12) United States Patent
Marston et al.

(10) Patent No.: US 9,972,171 B2
(45) Date of Patent: May 15, 2018

(54) GAMING SYSTEM AND METHOD FOR PROVIDING A TRIGGERING EVENT BASED ON A COLLECTION OF UNITS FROM DIFFERENT GAMES

(71) Applicant: IGT, Las Vegas, NV (US)

(72) Inventors: Daniel W. Marston, Reno, NV (US); Sek Hwan Joung, Reno, NV (US)

(73) Assignee: IGT, Las Vegas, NV (US)

( * ) Notice: Subject to any disclaimer, the term of this patent is extended or adjusted under 35 U.S.C. 154(b) by 217 days.

(21) Appl. No.: 14/864,052

(22) Filed: Sep. 24, 2015

(65) Prior Publication Data

US 2017/0092070 A1 Mar. 30, 2017

(51) Int. Cl.
*A63F 13/00* (2014.01)
*G07F 17/32* (2006.01)

(52) U.S. Cl.
CPC ...... *G07F 17/3267* (2013.01); *G07F 17/3227* (2013.01); *G07F 17/3239* (2013.01); *G07F 17/3246* (2013.01); *G07F 17/3248* (2013.01); *G07F 17/3255* (2013.01)

(58) Field of Classification Search
CPC ............. G07F 17/3227; G07F 17/3239; G07F 17/3246; G07F 17/3248; G07F 17/3255; G07F 17/3267
USPC ............................................................ 463/25
See application file for complete search history.

(56) References Cited

U.S. PATENT DOCUMENTS

| | | | |
|---|---|---|---|
| 4,335,809 | A | 6/1982 | Wain |
| 4,572,509 | A | 2/1986 | Sitrick |
| 4,624,459 | A | 11/1986 | Kaufman |
| 4,648,600 | A | 3/1987 | Olliges |
| 4,652,998 | A | 3/1987 | Koza et al. |
| 4,695,053 | A | 9/1987 | Vazquez, Jr. et al. |
| 4,842,278 | A | 6/1989 | Markowicz |
| 4,856,787 | A | 8/1989 | Itkis |
| 4,866,515 | A | 9/1989 | Tagawa et al. |
| 4,924,378 | A | 5/1990 | Hershey et al. |
| 5,085,435 | A | 2/1992 | Rossides |
| 5,138,712 | A | 8/1992 | Corbin |
| 5,142,622 | A | 8/1992 | Owens |
| 5,178,390 | A | 1/1993 | Okada |
| 5,179,517 | A | 1/1993 | Sarbin et al. |
| 5,265,874 | A | 11/1993 | Dickinson et al. |

(Continued)

FOREIGN PATENT DOCUMENTS

| | | |
|---|---|---|
| EP | 0843272 | 5/1998 |
| EP | 0945837 | 3/1999 |

(Continued)

*Primary Examiner* — Allen Chan
(74) *Attorney, Agent, or Firm* — Neal, Gerber & Eisenberg LLP

(57) ABSTRACT

A gaming system including a secondary event configured to be triggered based on a designated quantity or threshold of events occurring in association with a play of a primary wagering game and/or one or more plays of one or more bonus games associated with the play of the primary wagering game. In certain embodiments, by identifying and tracking an occurrence of an event through one or more game states associated with the placement of a wager, the gaming system provides a persistence aspect to a collection game which is associated with one or more games tied to or otherwise resulting from a single wager placed.

23 Claims, 9 Drawing Sheets

(56) References Cited

U.S. PATENT DOCUMENTS

| | | | |
|---|---|---|---|
| 5,276,312 | A | 1/1994 | McCarthy |
| 5,280,909 | A | 1/1994 | Tracy |
| 5,288,978 | A | 2/1994 | Iijima |
| 5,290,033 | A | 3/1994 | Bittner et al. |
| 5,305,195 | A | 4/1994 | Murphy |
| 5,326,104 | A | 7/1994 | Pease et al. |
| 5,342,047 | A | 8/1994 | Heidel et al. |
| 5,344,144 | A | 9/1994 | Canon |
| 5,349,642 | A | 9/1994 | Kingdon |
| 5,375,206 | A | 12/1994 | Hunter et al. |
| 5,377,993 | A | 1/1995 | Josephs |
| 5,404,567 | A | 4/1995 | DePietro et al. |
| 5,429,361 | A | 7/1995 | Raven et al. |
| 5,430,791 | A | 7/1995 | Feit et al. |
| 5,438,508 | A | 8/1995 | Wyman |
| 5,449,173 | A | 9/1995 | Thomas et al. |
| 5,470,079 | A | 11/1995 | LeStrange et al. |
| 5,472,196 | A | 12/1995 | Rusnak |
| 5,499,340 | A | 3/1996 | Barritz |
| 5,507,491 | A | 4/1996 | Gatto et al. |
| 5,511,781 | A | 4/1996 | Wood et al. |
| 5,530,232 | A | 6/1996 | Taylor |
| 5,542,669 | A | 8/1996 | Charron et al. |
| 5,559,313 | A | 9/1996 | Claus et al. |
| 5,560,603 | A | 10/1996 | Seelig et al. |
| 5,564,700 | A | 10/1996 | Celona |
| 5,566,337 | A | 10/1996 | Szymanski et al. |
| 5,578,808 | A | 11/1996 | Taylor |
| 5,580,311 | A | 12/1996 | Haste, III |
| 5,586,257 | A | 12/1996 | Perlman |
| 5,586,937 | A | 12/1996 | Menashe |
| 5,617,331 | A | 4/1997 | Wakai et al. |
| 5,620,182 | A | 4/1997 | Rossides |
| 5,626,341 | A | 5/1997 | Jones et al. |
| 5,630,757 | A | 5/1997 | Gagin et al. |
| 5,640,192 | A | 6/1997 | Garfinkle |
| 5,643,086 | A | 7/1997 | Alcorn et al. |
| 5,649,118 | A | 7/1997 | Carlisle et al. |
| 5,655,603 | A | 8/1997 | Schulte et al. |
| 5,655,961 | A | 8/1997 | Acres et al. |
| 5,664,998 | A | 9/1997 | Seelig et al. |
| 5,671,412 | A | 9/1997 | Christiano |
| 5,702,304 | A | 12/1997 | Acres et al. |
| 5,708,709 | A | 1/1998 | Rose |
| 5,717,604 | A | 2/1998 | Wiggins |
| 5,741,183 | A | 4/1998 | Acres et al. |
| 5,745,879 | A | 4/1998 | Wyman |
| 5,749,784 | A | 5/1998 | Clapper, Jr. |
| 5,752,882 | A | 5/1998 | Acres et al. |
| 5,755,621 | A | 5/1998 | Marks et al. |
| 5,758,069 | A | 5/1998 | Olsen |
| 5,759,102 | A | 6/1998 | Pease et al. |
| 5,762,552 | A | 6/1998 | Vuong et al. |
| 5,766,076 | A | 6/1998 | Pease et al. |
| 5,768,382 | A | 6/1998 | Schneier et al. |
| 5,779,545 | A | 7/1998 | Berg et al. |
| 5,779,549 | A | 7/1998 | Walker et al. |
| 5,788,573 | A | 8/1998 | Baerlocher et al. |
| 5,800,268 | A | 9/1998 | Molnick |
| 5,800,269 | A | 9/1998 | Holch et al. |
| 5,806,855 | A | 9/1998 | Cherry |
| 5,816,918 | A | 10/1998 | Kelly et al. |
| 5,820,459 | A | 10/1998 | Acres et al. |
| 5,828,840 | A | 10/1998 | Cowan et al. |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| 5,845,283 | A | 12/1998 | Williams et al. |
| 5,848,932 | A | 12/1998 | Adams |
| 5,851,011 | A | 12/1998 | Lott |
| 5,851,149 | A | 12/1998 | Xidos et al. |
| 5,855,515 | A | 1/1999 | Pease et al. |
| 5,871,398 | A | 2/1999 | Schneier et al. |
| 5,876,284 | A | 3/1999 | Acres et al. |
| 5,882,261 | A | 3/1999 | Adams |
| 5,885,158 | A | 3/1999 | Torango et al. |
| 5,903,732 | A | 5/1999 | Reed et al. |
| 5,905,248 | A | 5/1999 | Russell et al. |
| 5,913,164 | A | 6/1999 | Pawa et al. |
| 5,917,725 | A | 6/1999 | Thacher et al. |
| 5,918,039 | A | 6/1999 | Buswell et al. |
| 5,925,127 | A | 7/1999 | Ahmad |
| 5,941,773 | A | 8/1999 | Harlick |
| 5,947,820 | A | 9/1999 | Morro et al. |
| 5,947,822 | A | 9/1999 | Weiss |
| 5,951,611 | A | 9/1999 | La Pierre |
| 5,971,271 | A | 10/1999 | Wynn et al. |
| 5,971,849 | A | 10/1999 | Falciglia |
| 5,974,409 | A | 10/1999 | Sanu et al. |
| 5,980,093 | A | 11/1999 | Jones et al. |
| 5,980,384 | A | 11/1999 | Barrie |
| 5,983,190 | A | 11/1999 | Trower, II et al. |
| 5,991,760 | A | 11/1999 | Gauvin et al. |
| 5,991,790 | A | 11/1999 | Shah et al. |
| 5,996,068 | A | 11/1999 | Dwyer, III et al. |
| 5,997,400 | A | 12/1999 | Seelig et al. |
| 5,997,401 | A | 12/1999 | Crawford |
| 5,999,808 | A | 12/1999 | La Due |
| 6,001,016 | A | 12/1999 | Walker et al. |
| 6,003,066 | A | 12/1999 | Ryan et al. |
| 6,003,094 | A | 12/1999 | Dean |
| 6,003,123 | A | 12/1999 | Carter et al. |
| 6,004,207 | A | 12/1999 | Wilson, Jr. et al. |
| 6,011,850 | A | 1/2000 | Bertrand et al. |
| 6,012,832 | A | 1/2000 | Saunders et al. |
| 6,012,982 | A | 1/2000 | Piechowiak et al. |
| 6,015,344 | A | 1/2000 | Kelly et al. |
| 6,024,640 | A | 2/2000 | Walker et al. |
| 6,033,307 | A | 3/2000 | Vancura |
| 6,048,269 | A | 4/2000 | Burns et al. |
| 6,056,289 | A | 5/2000 | Clapper, Jr. |
| 6,059,289 | A | 5/2000 | Vancura |
| 6,068,552 | A | 5/2000 | Walker et al. |
| 6,068,982 | A | 5/2000 | Rolfe et al. |
| 6,071,190 | A | 6/2000 | Weiss et al. |
| 6,085,247 | A | 7/2000 | Parsons, Jr. et al. |
| 6,089,975 | A | 7/2000 | Dunn |
| 6,089,977 | A | 7/2000 | Bennett |
| 6,089,982 | A | 7/2000 | Holch et al. |
| 6,099,408 | A | 8/2000 | Schneier et al. |
| 6,106,396 | A | 8/2000 | Alcorn et al. |
| 6,108,420 | A | 8/2000 | Larose et al. |
| 6,110,041 | A | 8/2000 | Walker et al. |
| 6,113,098 | A | 9/2000 | Adams |
| 6,113,495 | A | 9/2000 | Walker et al. |
| 6,117,013 | A | 9/2000 | Eiba |
| 6,126,542 | A | 10/2000 | Fier |
| 6,135,884 | A | 10/2000 | Hedrick et al. |
| 6,135,887 | A | 10/2000 | Pease et al. |
| 6,141,737 | A | 10/2000 | Krantz et al. |
| 6,142,872 | A | 11/2000 | Walker et al. |
| 6,149,522 | A | 11/2000 | Alcorn et al. |
| 6,151,707 | A | 11/2000 | Hecksel et al. |
| 6,159,098 | A | 12/2000 | Slomiany et al. |
| 6,162,121 | A | 12/2000 | Morro et al. |
| 6,162,122 | A | 12/2000 | Acres et al. |
| 6,168,523 | B1 | 1/2001 | Piechowiak et al. |
| 6,190,255 | B1 | 2/2001 | Thomas et al. |
| 6,203,430 | B1 | 3/2001 | Walker et al. |
| 6,206,782 | B1 | 3/2001 | Walker et al. |
| 6,217,448 | B1 | 4/2001 | Olsen |
| 6,219,836 | B1 | 4/2001 | Wells et al. |
| 6,224,486 | B1 | 5/2001 | Walker et al. |
| 6,231,445 | B1 | 5/2001 | Acres |
| 6,234,900 | B1 | 5/2001 | Cumbers |
| 6,241,608 | B1 | 6/2001 | Torango |
| 6,244,958 | B1 | 6/2001 | Acres |
| 6,251,014 | B1 | 6/2001 | Stockdale et al. |
| 6,254,483 | B1 | 7/2001 | Acres |
| 6,257,981 | B1 | 7/2001 | Acres et al. |
| 6,264,561 | B1 | 7/2001 | Saffari et al. |
| 6,267,671 | B1 | 7/2001 | Hogan |
| 6,270,409 | B1 | 8/2001 | Shuster |

(56) References Cited

U.S. PATENT DOCUMENTS 6,287,200 B1 9/2001 Sharma
6,287,202 B1 9/2001 Pascal et al.
6,293,866 B1 9/2001 Walker et al.
6,302,793 B1 10/2001 Fertitta, III et al.
6,304,905 B1 10/2001 Clark
6,308,271 B2 10/2001 Tanaka
6,311,978 B1 11/2001 Moody
6,312,332 B1 11/2001 Walker et al.
6,312,333 B1 11/2001 Acres
6,319,122 B1 11/2001 Packes, Jr. et al.
6,319,125 B1 11/2001 Acres
6,322,309 B1 11/2001 Thomas et al.
6,328,649 B1 12/2001 Randall et al.
6,345,386 B1 2/2002 Delo et al.
6,353,928 B1 3/2002 Altberg et al.
6,354,946 B1 3/2002 Finn
6,358,150 B1 3/2002 Mir et al.
6,361,437 B1 3/2002 Walker et al.
6,361,441 B1 3/2002 Walker et al.
6,364,314 B1 4/2002 Canterbury
6,364,768 B1 4/2002 Acres et al.
6,368,216 B1 4/2002 Hedrick et al.
6,371,852 B1 4/2002 Acres
6,375,567 B1 4/2002 Acres
6,375,569 B1 4/2002 Acres
6,383,074 B1 5/2002 Boggs
6,389,538 B1 5/2002 Gruse et al.
6,389,589 B1 5/2002 Mishra et al.
6,394,907 B1 5/2002 Rowe
6,397,381 B1 5/2002 Delo et al.
6,398,218 B1 6/2002 Vancura
6,398,643 B1 6/2002 Knowles et al.
6,402,614 B1 6/2002 Schneier et al.
6,409,602 B1 6/2002 Wiltshire et al.
6,418,554 B1 7/2002 Delo et al.
6,425,828 B2 7/2002 Walker et al.
6,427,227 B1 7/2002 Chamberlain
6,431,983 B2 8/2002 Acres
6,439,996 B2 8/2002 LeMay et al.
6,442,529 B1 8/2002 Krishan et al.
6,443,452 B1 9/2002 Brune
6,443,839 B2 9/2002 Stockdale et al.
6,450,887 B1 9/2002 Mir et al.
6,457,175 B1 9/2002 Lerche
6,488,585 B1 12/2002 Wells et al.
6,503,146 B2 1/2003 Walker et al.
6,506,118 B1 1/2003 Baerlocher et al.
6,508,710 B1 1/2003 Paravia et al.
6,523,166 B1 2/2003 Mishra et al.
6,527,638 B1 3/2003 Walker et al.
6,532,543 B1 3/2003 Smith et al.
6,533,273 B2 3/2003 Cole et al.
6,533,664 B1 3/2003 Crumby
6,558,255 B2 5/2003 Walker et al.
6,565,091 B2 5/2003 Weingardt
6,565,434 B1 5/2003 Acres
6,575,832 B1 6/2003 Manfredi et al.
6,578,199 B1 6/2003 Tsou et al.
6,592,457 B1 7/2003 Frohm et al.
6,595,856 B1 7/2003 Ginsburg et al.
6,599,193 B2 7/2003 Baerlocher et al.
6,607,438 B2 8/2003 Baerlocher et al.
6,607,439 B2 8/2003 Schneier et al.
6,609,971 B2 8/2003 Vancura
6,609,973 B1 8/2003 Weiss
6,609,978 B1 8/2003 Paulsen
6,612,574 B1 9/2003 Cole et al.
6,612,575 B1 9/2003 Cole et al.
6,620,047 B1 9/2003 Alcorn et al.
6,628,939 B2 9/2003 Paulsen
6,638,170 B1 10/2003 Crumby
6,645,077 B2 11/2003 Rowe
6,656,048 B2 12/2003 Olsen
6,682,423 B2 1/2004 Brosnan et al.
6,685,567 B2 2/2004 Cockerille et al.
6,692,355 B2 2/2004 Baerlocher et al.
6,699,124 B2 3/2004 Suchocki
6,712,697 B2 3/2004 Acres
6,712,699 B2 3/2004 Walker et al.
6,712,702 B2 3/2004 Goldberg et al.
6,722,985 B2 4/2004 Criss-Puszkiewicz et al.
6,722,986 B1 4/2004 Lyons et al.
6,726,563 B1 4/2004 Baerlocher et al.
6,729,956 B2 5/2004 Wolf et al.
6,729,957 B2 5/2004 Burns et al.
6,729,958 B2 5/2004 Burns et al.
6,733,389 B2 5/2004 Webb et al.
6,733,390 B2 5/2004 Walker et al.
6,736,725 B2 5/2004 Burns et al.
6,739,973 B1 5/2004 Lucchesi et al.
6,746,327 B2 6/2004 Frohm et al.
6,749,510 B2 6/2004 Giobbi
6,755,742 B1 6/2004 Hartman et al.
6,758,747 B2 7/2004 Baerlocher
6,782,477 B2 8/2004 McCarroll
6,790,142 B2 9/2004 Okada et al.
6,790,143 B2 9/2004 Crumby
6,793,578 B2 9/2004 Luccesi et al.
6,800,030 B2 10/2004 Acres
6,802,778 B1 10/2004 LeMay et al.
6,804,763 B1 10/2004 Stockdale et al.
6,805,634 B1 10/2004 Wells et al.
6,811,488 B2 11/2004 Paravia et al.
6,813,765 B1 11/2004 Flores
6,816,882 B1 11/2004 Conner et al.
6,823,456 B1 11/2004 Dan et al.
6,830,515 B2 12/2004 Rowe
6,832,958 B2 12/2004 Acres et al.
6,834,245 B2 12/2004 Ota et al.
6,836,794 B1 12/2004 Lucovsky et al.
6,843,723 B2 1/2005 Joshi
6,843,725 B2 1/2005 Nelson
6,846,238 B2 1/2005 Wells
6,848,995 B1 2/2005 Walker et al.
6,852,031 B1 2/2005 Rowe
6,855,054 B2 2/2005 White et al.
6,855,057 B2 2/2005 Namba et al.
6,857,959 B1 2/2005 Nguyen
6,863,608 B1 3/2005 LeMay et al.
6,866,581 B2 3/2005 Martinek et al.
6,866,584 B2 3/2005 Michaelson
6,866,586 B2 3/2005 Oberberger et al.
6,869,360 B2 3/2005 Marks et al.
6,875,109 B2 4/2005 Stockdale
6,875,110 B1 4/2005 Crumby
6,878,063 B2 4/2005 Manfredi et al.
6,884,162 B2 4/2005 Raverdy et al.
6,884,166 B2 4/2005 Leen et al.
6,884,170 B2 4/2005 Rowe
6,884,171 B2 4/2005 Eck et al.
6,884,173 B2 4/2005 Gauselmann
6,884,174 B2 4/2005 Lundy et al.
6,887,151 B2 5/2005 Leen et al.
6,887,154 B1 5/2005 Luciano et al.
6,887,156 B2 5/2005 DeWeese et al.
6,889,159 B2 5/2005 Klotz et al.
6,890,256 B2 5/2005 Walker et al.
6,892,182 B1 5/2005 Rowe et al.
6,896,616 B2 5/2005 Weiss
6,896,618 B2 5/2005 Benoy et al.
6,899,627 B2 5/2005 Lam et al.
6,899,628 B2 5/2005 Leen et al.
6,901,375 B2 5/2005 Fernandez
6,902,481 B2 6/2005 Breckner et al.
6,905,411 B2 6/2005 Nguyen et al.
6,908,391 B2 6/2005 Gatto et al.
6,910,964 B2 6/2005 Acres
6,910,965 B2 6/2005 Downes
6,923,721 B2 8/2005 Luciano et al.
6,939,234 B2 9/2005 Beatty
6,942,571 B1 9/2005 McAllister et al.
6,945,870 B2 9/2005 Gatto et al.
6,955,600 B2 10/2005 Glavich et al.
6,969,319 B2 11/2005 Rowe et al.

(56) References Cited

U.S. PATENT DOCUMENTS

| | | | |
|---|---|---|---|
| 6,981,917 B2 | 1/2006 | Webb et al. | |
| 6,991,544 B2 | 1/2006 | Soltys et al. | |
| 6,997,807 B2 | 2/2006 | Weiss | |
| 7,008,321 B2 | 3/2006 | Rowe et al. | |
| 7,011,581 B2 | 3/2006 | Cole et al. | |
| 7,025,674 B2 | 4/2006 | Adams et al. | |
| 7,051,004 B2 | 5/2006 | Nuttall et al. | |
| 7,056,215 B1 | 6/2006 | Olive | |
| 7,063,617 B2 | 6/2006 | Brosnan et al. | |
| 7,066,814 B2 | 6/2006 | Glavich et al. | |
| 7,070,501 B2 | 7/2006 | Cormack et al. | |
| 7,094,149 B2 | 8/2006 | Walker et al. | |
| 7,121,942 B2 | 10/2006 | Baerlocher | |
| 7,169,046 B2 | 1/2007 | Webb et al. | |
| 7,223,172 B2 | 5/2007 | Baerlocher et al. | |
| 7,238,110 B2 | 7/2007 | Glavich et al. | |
| 7,318,773 B2 | 1/2008 | Baerlocher | |
| 7,473,174 B2 | 1/2009 | Cuddy et al. | |
| 7,674,180 B2 | 3/2010 | Graham et al. | |
| 7,789,747 B2 | 9/2010 | Glavich et al. | |
| 7,789,755 B2 | 9/2010 | Davis et al. | |
| 7,862,420 B2 * | 1/2011 | Peterson | G07F 17/32 463/20 |
| 7,874,913 B2 | 1/2011 | Webb et al. | |
| 8,002,620 B2 | 8/2011 | Nicely et al. | |
| 8,070,597 B2 | 12/2011 | Cuddy | |
| 8,092,302 B2 | 1/2012 | Cuddy et al. | |
| 8,142,280 B2 | 3/2012 | Walker et al. | |
| 8,152,630 B2 | 4/2012 | Cohen | |
| 8,206,209 B1 | 6/2012 | Fox | |
| 8,206,212 B2 | 6/2012 | Iddings et al. | |
| 8,216,062 B2 | 7/2012 | Baerlocher et al. | |
| 8,221,226 B2 | 7/2012 | Baerlocher et al. | |
| 8,246,449 B2 | 8/2012 | Baerlocher et al. | |
| 8,342,945 B2 * | 1/2013 | Gomez | G07F 17/3244 463/16 |
| 8,376,836 B2 | 2/2013 | Baerlocher et al. | |
| 8,382,572 B2 | 2/2013 | Hoffman et al. | |
| 8,425,303 B2 | 4/2013 | Kennedy et al. | |
| 8,449,378 B2 | 5/2013 | Michaelson et al. | |
| 8,517,818 B2 | 8/2013 | Nicely et al. | |
| 8,900,053 B2 | 12/2014 | Graham et al. | |
| 2001/0036857 A1 | 11/2001 | Mothwurf et al. | |
| 2001/0044337 A1 | 11/2001 | Rowe et al. | |
| 2001/0046893 A1 | 11/2001 | Giobbi et al. | |
| 2001/0055990 A1 | 12/2001 | Acres | |
| 2002/0032049 A1 | 3/2002 | Walker et al. | |
| 2002/0034977 A1 | 3/2002 | Burns et al. | |
| 2002/0042296 A1 | 4/2002 | Walker et al. | |
| 2002/0045484 A1 | 4/2002 | Eck et al. | |
| 2002/0057800 A1 | 5/2002 | Gordon et al. | |
| 2002/0058546 A2 | 5/2002 | Acres | |
| 2002/0065123 A1 | 5/2002 | Packes et al. | |
| 2002/0068629 A1 | 6/2002 | Allen et al. | |
| 2002/0068631 A1 | 6/2002 | Raverdy et al. | |
| 2002/0071557 A1 | 6/2002 | Nguyen | |
| 2002/0071560 A1 | 6/2002 | Kurn et al. | |
| 2002/0077174 A1 | 6/2002 | Luciano et al. | |
| 2002/0080969 A1 | 6/2002 | Giobbi | |
| 2002/0116615 A1 | 8/2002 | Nguyen et al. | |
| 2002/0123376 A1 | 9/2002 | Walker et al. | |
| 2002/0137217 A1 | 9/2002 | Rowe | |
| 2002/0138594 A1 | 9/2002 | Rowe | |
| 2002/0142828 A1 | 10/2002 | Moody | |
| 2002/0144116 A1 | 10/2002 | Giobbi | |
| 2002/0151354 A1 | 10/2002 | Boesen et al. | |
| 2002/0151356 A1 | 10/2002 | Burns et al. | |
| 2002/0151360 A1 | 10/2002 | Durham et al. | |
| 2002/0160826 A1 | 10/2002 | Gomez et al. | |
| 2002/0169022 A1 | 11/2002 | Canterbury | |
| 2002/0173355 A1 | 11/2002 | Walker et al. | |
| 2002/0174160 A1 | 11/2002 | Gatto et al. | |
| 2002/0174444 A1 | 11/2002 | Gatto et al. | |
| 2002/0177483 A1 | 11/2002 | Cannon | |
| 2002/0187827 A1 | 12/2002 | Blankstein | |
| 2002/0188940 A1 | 12/2002 | Breckner et al. | |
| 2003/0027638 A1 | 2/2003 | Schneider et al. | |
| 2003/0045351 A1 | 3/2003 | Gauselmann | |
| 2003/0045354 A1 | 3/2003 | Giobbi | |
| 2003/0054879 A1 | 3/2003 | Schneier et al. | |
| 2003/0060259 A1 | 3/2003 | Mierau et al. | |
| 2003/0060276 A1 | 3/2003 | Walker et al. | |
| 2003/0060286 A1 | 3/2003 | Walker et al. | |
| 2003/0064771 A1 | 4/2003 | Morrow et al. | |
| 2003/0064795 A1 | 4/2003 | Baerlocher et al. | |
| 2003/0064807 A1 | 4/2003 | Walker et al. | |
| 2003/0069058 A1 | 4/2003 | Byrne | |
| 2003/0073497 A1 | 4/2003 | Nelson | |
| 2003/0078089 A1 | 4/2003 | Gray et al. | |
| 2003/0078094 A1 | 4/2003 | Gatto et al. | |
| 2003/0078101 A1 | 4/2003 | Schneider et al. | |
| 2003/0083943 A1 | 5/2003 | Adams et al. | |
| 2003/0092489 A1 | 5/2003 | Veradej | |
| 2003/0092490 A1 | 5/2003 | Gauselmann | |
| 2003/0093669 A1 | 5/2003 | Morais et al. | |
| 2003/0100359 A1 | 5/2003 | Loose et al. | |
| 2003/0100369 A1 | 5/2003 | Gatto et al. | |
| 2003/0100370 A1 | 5/2003 | Gatto et al. | |
| 2003/0100371 A1 | 5/2003 | Gatto et al. | |
| 2003/0100372 A1 | 5/2003 | Gatto et al. | |
| 2003/0104854 A1 | 6/2003 | Cannon | |
| 2003/0115351 A1 | 6/2003 | Giobbi | |
| 2003/0140134 A1 | 7/2003 | Swanson et al. | |
| 2003/0162589 A1 | 8/2003 | Nguyen et al. | |
| 2003/0171145 A1 | 9/2003 | Rowe | |
| 2003/0171149 A1 | 9/2003 | Rothschild | |
| 2003/0176216 A1 | 9/2003 | Storey | |
| 2003/0176219 A1 | 9/2003 | Manfredi et al. | |
| 2003/0181231 A1 | 9/2003 | Vancura et al. | |
| 2003/0188306 A1 | 10/2003 | Harris et al. | |
| 2003/0190941 A1 | 10/2003 | Byrne | |
| 2003/0195033 A1 | 10/2003 | Gazdic et al. | |
| 2003/0212597 A1 | 11/2003 | Ollins | |
| 2003/0216182 A1 | 11/2003 | Gauselmann | |
| 2003/0224852 A1 | 12/2003 | Walker et al. | |
| 2003/0228904 A1 | 12/2003 | Acres et al. | |
| 2003/0228907 A1 | 12/2003 | Gatto et al. | |
| 2003/0228912 A1 | 12/2003 | Wells et al. | |
| 2003/0232650 A1 | 12/2003 | Beatty | |
| 2004/0002379 A1 | 1/2004 | Parrott et al. | |
| 2004/0002381 A1 | 1/2004 | Alcorn et al. | |
| 2004/0002385 A1 | 1/2004 | Nguyen | |
| 2004/0003389 A1 | 1/2004 | Reynar et al. | |
| 2004/0005919 A1 | 1/2004 | Walker et al. | |
| 2004/0010700 A1 | 1/2004 | Mont | |
| 2004/0015423 A1 | 1/2004 | Walker et al. | |
| 2004/0023721 A1 | 2/2004 | Giobbi | |
| 2004/0024666 A1 | 2/2004 | Walker et al. | |
| 2004/0029635 A1 | 2/2004 | Giobbi | |
| 2004/0033831 A1 | 2/2004 | Tarantino | |
| 2004/0038723 A1 | 2/2004 | Schneier et al. | |
| 2004/0048660 A1 | 3/2004 | Gentles et al. | |
| 2004/0048667 A1 | 3/2004 | Rowe | |
| 2004/0053664 A1 | 3/2004 | Byrne | |
| 2004/0054952 A1 | 3/2004 | Morrow et al. | |
| 2004/0063489 A1 | 4/2004 | Crumby | |
| 2004/0072604 A1 | 4/2004 | Toyoda | |
| 2004/0072608 A1 | 4/2004 | Toyoda | |
| 2004/0072618 A1 | 4/2004 | Bartholomew et al. | |
| 2004/0082373 A1 | 4/2004 | Cole et al. | |
| 2004/0082385 A1 | 4/2004 | Silva et al. | |
| 2004/0092310 A1 | 5/2004 | Brosnan et al. | |
| 2004/0098597 A1 | 5/2004 | Giobbi | |
| 2004/0106452 A1 | 6/2004 | Nguyen et al. | |
| 2004/0110557 A1 | 6/2004 | Rowe | |
| 2004/0124243 A1 | 7/2004 | Gatto et al. | |
| 2004/0127279 A1 | 7/2004 | Gatto et al. | |
| 2004/0132532 A1 | 7/2004 | Brosnan et al. | |
| 2004/0133485 A1 | 7/2004 | Schoonmaker et al. | |
| 2004/0142739 A1 | 7/2004 | Loose et al. | |
| 2004/0142742 A1 | 7/2004 | Schneider et al. | |
| 2004/0152509 A1 | 8/2004 | Hornik et al. | |
| 2004/0162144 A1 | 8/2004 | Loose et al. | |
| 2004/0166923 A1 | 8/2004 | Michaelson et al. | |

(56) References Cited

U.S. PATENT DOCUMENTS

2004/0166931 A1 8/2004 Criss-Puszkiewicz et al.
2004/0166940 A1 8/2004 Rothschild
2004/0166942 A1 8/2004 Muir
2004/0176162 A1 9/2004 Rothschild
2004/0176167 A1 9/2004 Michaelson et al.
2004/0179701 A1 9/2004 Boyd
2004/0180721 A1 9/2004 Rowe
2004/0180722 A1 9/2004 Giobbi
2004/0185936 A1 9/2004 Block et al.
2004/0193726 A1 9/2004 Gatto et al.
2004/0198494 A1 10/2004 Nguyen et al.
2004/0198496 A1 10/2004 Gatto et al.
2004/0204244 A1 10/2004 Rathsack et al.
2004/0214622 A1 10/2004 Atkinson
2004/0214627 A1 10/2004 Jordan et al.
2004/0214640 A1 10/2004 Giobbi
2004/0214641 A1 10/2004 Giobbi
2004/0215756 A1 10/2004 VanAntwerp et al.
2004/0219967 A1 11/2004 Giobbi et al.
2004/0219983 A1 11/2004 Giobbi
2004/0224770 A1 11/2004 Wolf et al.
2004/0229684 A1 11/2004 Blackburn et al.
2004/0229698 A1 11/2004 Lind et al.
2004/0229699 A1 11/2004 Gentles et al.
2004/0235559 A1 11/2004 Brosnan et al.
2004/0235563 A1 11/2004 Blackburn et al.
2004/0242298 A1 12/2004 Inamura et al.
2004/0242328 A1 12/2004 Blackburn et al.
2004/0242329 A1 12/2004 Blackburn et al.
2004/0242330 A1 12/2004 Blackburn et al.
2004/0242331 A1 12/2004 Blackburn et al.
2004/0243848 A1 12/2004 Blackburn et al.
2004/0243849 A1 12/2004 Blackburn et al.
2004/0248642 A1 12/2004 Rothschild
2004/0248645 A1 12/2004 Blackburn et al.
2004/0248646 A1 12/2004 Canterbury
2004/0248651 A1 12/2004 Gagner
2004/0254006 A1 12/2004 Lam et al.
2004/0254013 A1 12/2004 Quraishi et al.
2004/0254014 A1 12/2004 Quraishi et al.
2004/0254954 A1 12/2004 Gatto et al.
2004/0255139 A1 12/2004 Giobbi
2004/0259629 A1 12/2004 Michaelson et al.
2004/0259633 A1 12/2004 Gentles et al.
2004/0259640 A1 12/2004 Gentles et al.
2004/0259643 A1 12/2004 Gentles
2004/0266532 A1 12/2004 Blackburn et al.
2004/0266533 A1 12/2004 Gentles et al.
2005/0003886 A1 1/2005 Englman et al.
2005/0009599 A1 1/2005 Ryan
2005/0009601 A1 1/2005 Manfredi et al.
2005/0009607 A1 1/2005 Russell et al.
2005/0010738 A1 1/2005 Stockdale et al.
2005/0014559 A1 1/2005 Mattice et al.
2005/0020354 A1 1/2005 Nguyen et al.
2005/0026679 A1 2/2005 Lucchesi et al.
2005/0032573 A1 2/2005 Acres et al.
2005/0032577 A1 2/2005 Blackburn et al.
2005/0037708 A1 2/2005 Torvinen
2005/0043072 A1 2/2005 Nelson
2005/0043088 A1 2/2005 Nguyen et al.
2005/0043090 A1 2/2005 Pryzby et al.
2005/0043094 A1 2/2005 Nguyen et al.
2005/0044535 A1 2/2005 Coppert
2005/0049037 A1 3/2005 Anderson et al.
2005/0054431 A1 3/2005 Walker et al.
2005/0054435 A1 3/2005 Rodgers et al.
2005/0054438 A1 3/2005 Rothschild et al.
2005/0054445 A1 3/2005 Gatto et al.
2005/0054447 A1 3/2005 Hiroyama et al.
2005/0054448 A1 3/2005 Frerking et al.
2005/0059457 A1 3/2005 Rothschild et al.
2005/0059493 A1 3/2005 Tyson et al.
2005/0059494 A1 3/2005 Kammler
2005/0064939 A1 3/2005 McSheffrey et al.
2005/0075983 A1 4/2005 St. Denis
2005/0081623 A1 4/2005 Frank
2005/0086286 A1 4/2005 Gatto et al.
2005/0090313 A1 4/2005 Rowe
2005/0096114 A1 5/2005 Cannon et al.
2005/0096126 A1 5/2005 Prasad et al.
2005/0096133 A1 5/2005 Hoefelmeyer et al.
2005/0097342 A1 5/2005 Gatto et al.
2005/0101370 A1 5/2005 Lind et al.
2005/0113172 A1 5/2005 Gong
2005/0114272 A1 5/2005 Herrmann et al.
2005/0119045 A1 6/2005 Fujimoto
2005/0119046 A1 6/2005 Fujimoto
2005/0120672 A1 6/2005 Gargiulo
2005/0137012 A1 6/2005 Michaelson
2005/0148385 A1 7/2005 Michaelson
2005/0153768 A1 7/2005 Paulsen
2005/0153773 A1 7/2005 Nguyen et al.
2005/0159200 A1 7/2005 Nicely et al.
2005/0239546 A1 10/2005 Hedrick et al.
2005/0261059 A1 11/2005 Nguyen et al.
2005/0261060 A1 11/2005 Nguyen et al.
2005/0261061 A1 11/2005 Nguyen et al.
2005/0266919 A1 12/2005 Rowe et al.
2005/0282629 A1 12/2005 Gagner
2005/0282638 A1 12/2005 Rowe
2006/0009273 A2 1/2006 Moshal
2006/0019747 A1 1/2006 Loose et al.
2006/0019750 A1 1/2006 Beatty
2006/0030409 A1 2/2006 Lechner et al.
2006/0031829 A1 2/2006 Harris et al.
2006/0035705 A1 2/2006 Jordan et al.
2006/0036573 A1 2/2006 Watanabe et al.
2006/0039132 A1 2/2006 Chen
2006/0040732 A1 2/2006 Baerlocher et al.
2006/0046839 A1 3/2006 Nguyen
2006/0052160 A1 3/2006 Saffari et al.
2006/0084502 A1 4/2006 Downs et al.
2006/0094508 A1 5/2006 D'Amico et al.
2006/0143085 A1 6/2006 Adams et al.
2006/0148561 A1 7/2006 Moser
2006/0172792 A1 8/2006 Vancura
2006/0194633 A1 8/2006 Paulsen
2006/0217183 A1 9/2006 Mierau et al.
2006/0287107 A1 12/2006 Okada
2007/0021182 A1 1/2007 Gauselmann
2007/0021187 A1 1/2007 Gauselmann
2007/0054733 A1 3/2007 Baerlocher
2007/0060321 A1 3/2007 Vasquez et al.
2007/0149268 A1 6/2007 Gauselmann
2007/0298875 A1 12/2007 Baerlocher et al.
2008/0032782 A1 2/2008 Boesen et al.
2008/0039191 A1 2/2008 Cuddy
2008/0064492 A1 3/2008 Oosthoek
2008/0076542 A1 3/2008 Iddings et al.
2008/0132324 A1 6/2008 Toyoda
2008/0194312 A1 8/2008 Nelson et al.
2008/0254858 A1 10/2008 Fujimoto et al.
2008/0311973 A1 12/2008 Jaffe
2009/0042645 A1 2/2009 Graham et al.
2009/0239639 A1 9/2009 Yoshizawa
2010/0081497 A1 4/2010 Wolf et al.
2010/0113122 A1 5/2010 Walker et al.
2010/0137056 A1 6/2010 Hoffman et al.
2010/0160028 A1* 6/2010 Robichaud .......... G07F 17/3267
463/20
2010/0267444 A1 10/2010 Walker et al.
2011/0003627 A1 1/2011 Nicely et al.
2012/0214580 A1 8/2012 Hoffman et al.
2013/0079110 A1 3/2013 Nicely et al.
2013/0084961 A1 4/2013 Radisich et al.
2013/0084962 A1 4/2013 Radisich et al.
2013/0084994 A1 4/2013 Farrar

(56) References Cited

U.S. PATENT DOCUMENTS

| | | | | |
|---|---|---|---|---|
| 2013/0157741 | A1* | 6/2013 | Pacey | G07F 17/3265 463/20 |
| 2015/0141134 | A1 | 5/2015 | Graham et al. | |

FOREIGN PATENT DOCUMENTS

| | | |
|---|---|---|
| EP | 0984409 | 3/2000 |
| EP | 1004970 | 5/2000 |
| EP | 1199690 | 2/2004 |
| EP | 0813132 | 1/2005 |
| EP | 1378873 | 3/2005 |
| EP | 1238688 | 5/2005 |
| EP | 1378874 | 5/2005 |
| EP | 1471710 | 5/2005 |
| EP | 1291048 | 6/2005 |
| GB | 2098778 | 11/1982 |
| GB | 2139390 | 11/1984 |
| GB | 2144644 | 3/1985 |
| GB | 2151054 | 7/1985 |
| GB | 2191030 | 12/1987 |
| GB | 2222712 | 3/1990 |
| GB | 2333880 | 8/1999 |
| GB | 2353128 | 2/2001 |
| WO | WO09835309 | 8/1998 |
| WO | WO09941718 | 8/1999 |
| WO | WO09965579 | 12/1999 |
| WO | WO00012186 | 3/2000 |
| WO | WO00025281 | 5/2000 |
| WO | WO00032286 | 6/2000 |
| WO | WO00067424 | 11/2000 |
| WO | WO00158550 | 8/2001 |
| WO | WO00161437 | 8/2001 |
| WO | WO003045515 | 6/2003 |
| WO | WO003045516 | 6/2003 |
| WO | WO2004004855 | 1/2004 |
| WO | WO2004103495 | 12/2004 |
| WO | WO2005028056 | 3/2005 |
| WO | WO2005029220 | 3/2005 |
| WO | WO2005033825 | 4/2005 |
| WO | WO2005033826 | 4/2005 |
| WO | WO2005120672 | 12/2005 |
| WO | WO2006027677 | 3/2006 |
| WO | WO2006039067 | 4/2006 |

* cited by examiner

1000

GAMING SYSTEM AND METHOD FOR PROVIDING A TRIGGERING EVENT BASED ON A COLLECTION OF UNITS FROM DIFFERENT GAMES

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain secondary games are played over the course of a number of plays of the primary or base game. Such secondary games provide the player an award for their persistence in playing the gaming machine for a prolonged number of plays or period of time. In these persistence secondary games, in association with one or more plays of the primary game, a portion of the secondary game is played or at least one secondary game element is provided to the player. After the player has obtained a number of secondary game elements (or advanced to the secondary game a number of times), these gaming machines provide a secondary game award to the player. The provided secondary game award is based on the plurality of obtained secondary game elements (or the plurality of plays of the secondary game) which occur based on triggering events associated with the plurality of plays of the primary game.

There is a continuing need to provide new and different gaming machines and gaming systems as well as new and different ways to provide awards to players including bonus awards.

SUMMARY

In various embodiments, the gaming system disclosed herein includes a secondary event configured to be triggered based on a designated quantity or threshold of events occurring in association with a play of a primary wagering game and/or one or more plays of one or more bonus games associated with the play of the primary wagering game. In these embodiments, as a result of a quantity of events, such as a quantity of secondary event triggering unit accumulation events, occurring in association with one or more game states following the placement of a wager, the gaming system triggers a secondary event (Le., a designated secondary game or designated bonus game). In such embodiments, the gaming system disclosed herein unlocks a secondary event after a quantity or threshold of events occur in any combination of a play of a primary game upon a placement of a wager and a play of one or more bonus games triggered in association with the play of the primary game. Accordingly, by identifying and tracking an occurrence of an event through one or more game states associated with the placement of a wager, the present disclosure provides a persistence aspect to a collection game which is associated with one or more games tied to or otherwise resulting from a single wager placed. Such a configuration increases the level of enjoyment and excitement for players as such players strive to unlock a secondary event (and previously unavailable awards) based on the collection of events during one or more other games played.

In certain embodiments, the gaming system includes a secondary event configured to be triggered based on a designated quantity of collection units or collection items (i.e., secondary event triggering units) accumulated in one or more games following the placement of a wager. In these embodiments, upon the placement of a wager, the gaming system provides a play of a primary game, wherein one or more collection units are available to be accumulated in association with the play of the primary game. For example, the gaming system accumulates any collection units displayed in association with any randomly determined primary game outcomes, such as any collection units displayed as sub-symbols of any displayed primary game symbols.

In addition to accumulating or collecting zero, one or more collection units in association with a play of a primary game, if one or more bonus games are triggered in association with the play of the primary game (and thus in association with the wager placed on the play of the primary game), the gaming system provides a play of such bonus games. One or more collection units are also available to be accumulated in association with the plays of the bonus games. For example, the gaming system accumulates any collection units displayed in association with any randomly determined bonus game outcomes, such as any collection units associated with any player picked selections of a selection bonus game. It should be appreciated that in different embodiments, the gaming system tracks or otherwise accounts for a quantity of collection units which occur: (i) in association with a play of a primary game, (ii) in association with zero, one or more plays of one or more bonus games triggered in association with the play of the wagered on primary game, (iii) independent of any displayed event occurring in the play of the primary game, and/or (iv) independent of any displayed event occurring in any play of any bonus game triggered in association with the play of the wagered on primary game.

In conjunction with accumulating or collecting zero, one or more collection units in association with a play of a primary game and further accumulating or collecting zero, one or more collection units in association with any plays of any bonus games, if the gaming system determines that a designated quantity or threshold of collection units have been accumulated in association with the play of the primary game and any play of any bonus game triggered in association with the play of the primary game, the gaming system triggers a play of a secondary event. That is, a secondary event triggering event occurs upon an accumulated quantity of collection units reaching or exceeding a threshold quantity. In one such embodiment, one or more features or attributes of the secondary event are based on the quantity of collection units accumulated when the secondary event is triggered. In one such embodiment, the gaming system enables for the further accumulation of collection units during the play of the secondary event such that one or more features or attributes of the secondary event are additionally or alternatively based on the quantity of collection units accumulated during the play of the secondary event.

Following the play of the secondary event (i.e., following any award provided in association with the play of the secondary event) or if the gaming system determines that a designated quantity or threshold of collection units has not been accumulated in association with the play of the primary game and any play of any bonus game triggered in association with the play of the primary game (and thus the gaming system does not trigger a play of a secondary event), the gaming system resets the quantity of accumulated collection units. The gaming system then awaits another wager on another play of the primary game to begin collecting collection units again. Such a resetting of the quantity of accumulated collection units after the last game or event associated with a wager placed provides that, in certain embodiments, each wager placed is associated with a distinct accumulation of collection units towards a play of a secondary event.

Accordingly, the gaming system disclosed herein provides a persistence collection aspect to any games which are played in association with a wager placed such that each of the games played or game states entered may potentially result in the triggering (i.e., unlocking) of a previously unavailable secondary event. Such a configuration provides an increased level of anticipation by certain players and a corresponding increased level of excitement for such players because one or more actions or decisions these players makes in association with their gaming experience (regardless of the game state such an action or decision occurs in) may lead to the player winning awards in a secondary event.

Additional features and advantages are described in, and will be apparent from, the following Detailed Description and the figures.

DETAILED DESCRIPTION

Accumulating Items Over Multiple Game States Associated with a Wager Placed

In various embodiments, the gaming system disclosed herein includes a secondary event configured to be triggered based on a designated quantity or threshold of events occurring in association with a play of a primary wagering game and/or one or more plays of one or more bonus games associated with the play of the primary wagering game. In these embodiments, as a result of a quantity of events, such as a quantity of secondary event triggering unit accumulation events, occurring in association with one or more game states following the placement of a wager, the gaming system triggers a secondary event (i.e., a designated secondary game or designated bonus game). In such embodiments, the gaming system disclosed herein unlocks a secondary event after a quantity or threshold of events occur in any combination of a play of a primary game upon a placement of a wager and a play of one or more bonus games triggered in association with the play of the primary game. Accordingly, by identifying and tracking an occurrence of an event through one or more game states associated with the placement of a wager, the present disclosure provides a persistence aspect to a collection game which is associated with one or more games tied to or otherwise resulting from a single wager placed. Such a configuration increases the level of enjoyment and excitement for players as such players strive to unlock a secondary event (and previously unavailable awards) based on the collection of events during one or more other games played.

It should be appreciated that while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
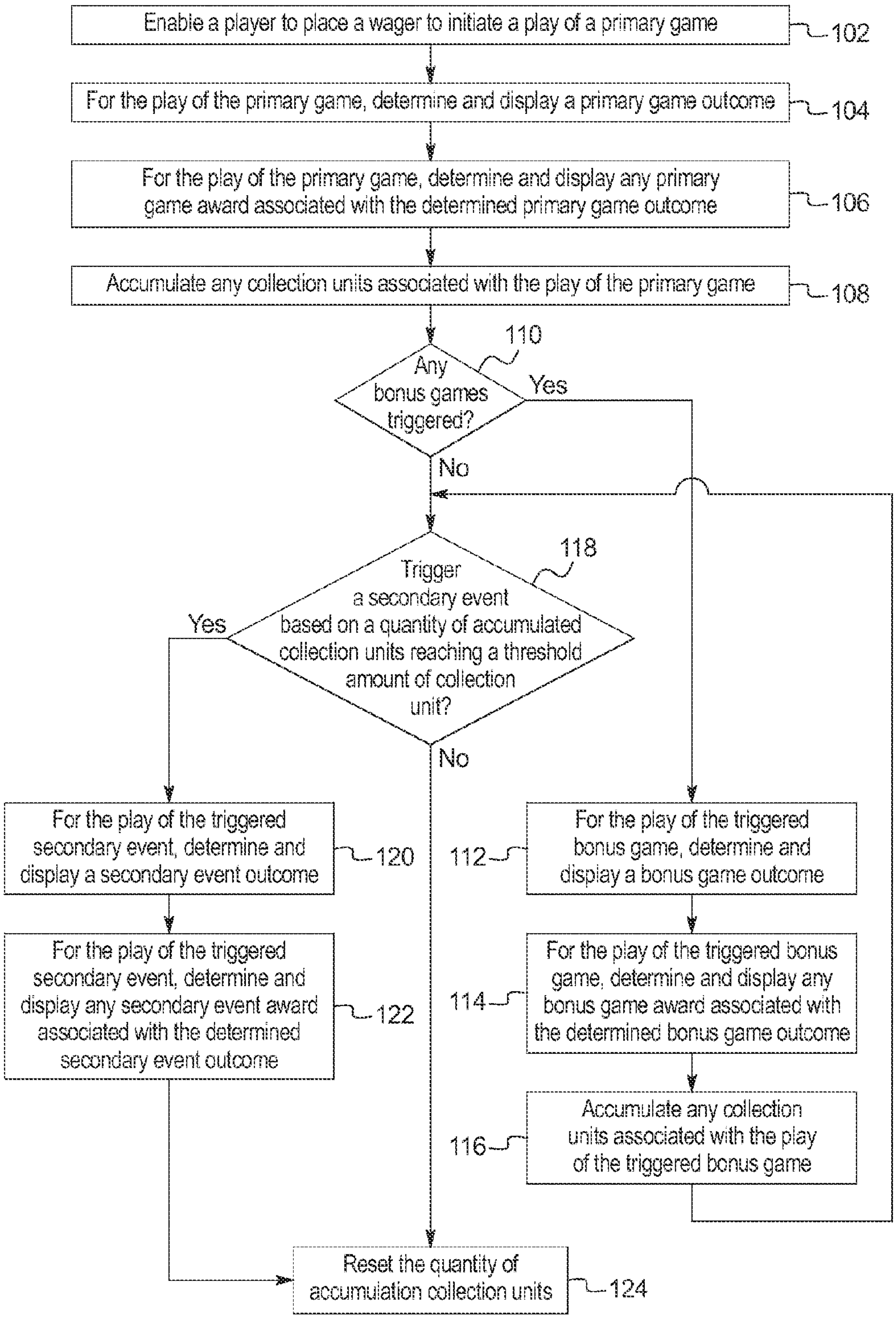
FIG. 1 is a flow-chart of one embodiment of the gaming system disclosed herein illustrating an accumulation of a quantity of collection units and a triggering of a secondary event based on the quantity of accumulated collection units.

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

Figure 2A:
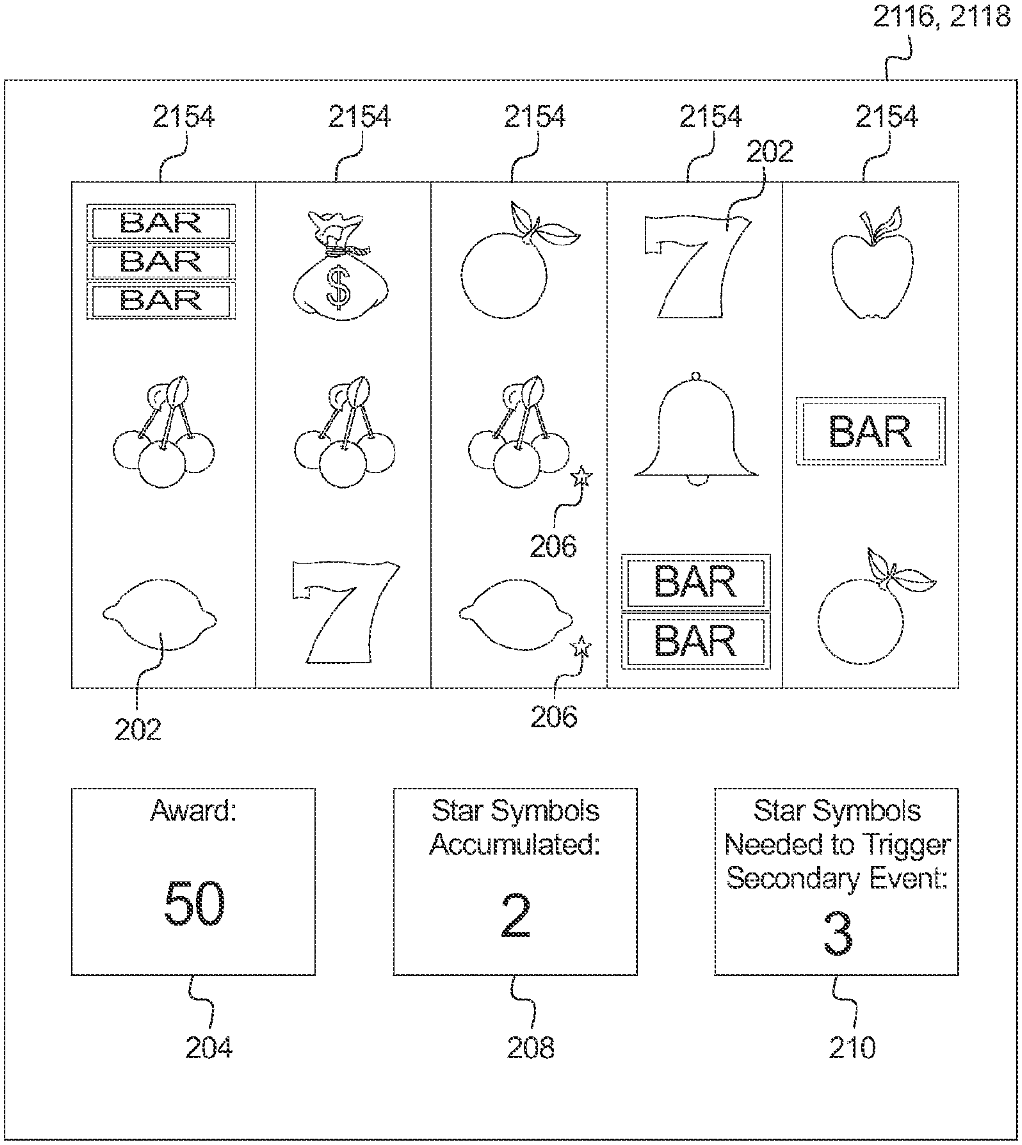
FIGS. 2A, 2B, 2C, and 2D are top plan views of a display device of one embodiment of the gaming system disclosed herein illustrating the play of various games and the accumulation of collection units associated with the plays of such games.

In operation of one embodiment of the gaming system disclosed herein, the gaming system enables a player to place a wager to initiate a play of a primary game as indicated in block 102 of FIG. 1. For the play of the primary game, the gaming system determines and displays a primary game outcome as indicated in block 104. The gaming system then determines and displays any primary game award associated with the determined primary game outcome as indicated in block 106. For example, as seen in FIG. 2A, the gaming system displays a plurality of randomly determined symbols 202 at a plurality of symbol display positions of a plurality of reels 2154. The gaming system of this example also determines that the symbol combination of cherry symbol—cherry symbol—cherry symbol is associated with an award of fifty credits (as indicated in the award indicator 204). Appropriate messages such as "YOU WIN $50.00 FOR YOUR THREE CHERRY SYMBOL COMBINATION" may be provided to the player visually, or through suitable audio or audiovisual displays.

In addition to determining and displaying any primary game award associated with the primary game outcome for the wagered on play of the primary game, the gaming system accumulates any collection units (i.e., secondary event triggering units) associated with the play of the primary game as indicated in block 108.

In one embodiment, the gaming system accumulates one or more collection units independent of any element displayed during the play of the wagered on primary game. In one such embodiment, no apparent reason is provided for accumulating one or more collection units in association with or otherwise during the play of the primary game. That is, in this embodiment, accumulating one or more collection units is not triggered by the occurrence of an event in the primary game or based specifically on the play of the primary game. Rather, the accumulation of one or more collection events occurs without any explanation or, alternatively, with a simple explanation.

In another embodiment, the gaming system accumulates one or more collection units in association with one or more symbols, symbol combinations or other game elements displayed during the play of the wagered on primary game. In one such embodiment, the gaming system accumulates one collection unit in association with each of one or more symbols, symbol combinations or other game elements displayed during the play of the wagered on primary game. In another such embodiment, the gaming system accumulates a plurality of collection units in association with each of one or more symbols, symbol combinations or other game elements displayed during the play of the wagered on primary game.

In one embodiment, one or more collection units are independent of the displayed primary game outcome. For example, a distinct area of one or more display devices display the result of one or more determinations, such as one or more random determinations, regarding whether any collection units are accumulated in association with the play of the primary game. In another example, one or more sub-games or side-games played as part of or otherwise in association with the play of the primary game display the result of one or more determinations, such as one or more random determinations, regarding whether any collection units are accumulated in association with the play of the primary game.

In another such embodiment, one or more collection units are associated with or otherwise part of the displayed primary game outcome. For example, one or more collection units are displayed as one or more symbols and/or one or more sub-symbols randomly determined and displayed during a play of a primary game. As seen in FIG. 2A, the gaming system displays two collection units as two sub-symbols 206 associated with two symbols 202 randomly generated as part of the primary game. In this example, the gaming system accumulates the two displayed collection units and displays to the player both the quantity of collection units accumulated 208 and the quantity of collection units needed to still be accumulated to cause a triggering of a secondary event 210. Appropriate messages such as "YOU COLLECTED TWO STAR SYMBOLS. COLLECT THREE MORE STAR SYMBOLS TO PLAY THE SUPER BONUS GAME" may be provided to the player visually, or through suitable audio or audiovisual displays.

In one embodiment wherein one or more collection units are displayed as one or more symbols of a reel game, such collection unit symbols are associated with (i.e., available to be displayed on) one, more or each of the reels of the reel game. In another embodiment wherein one or more collection units are displayed as one or more symbols of a reel game, such collection unit symbols are associated with (available to be displayed at) one, more or each of the symbol display positions of the reel game. In another embodiment wherein one or more collection units are displayed as one or more sub-symbols of a reel game, such collection unit sub-symbols are associated with (i.e., available to be displayed on) one, more or each of the reels of the reel game. In another embodiment wherein one or more collection units are displayed as one or more sub-symbols of a reel game, such collection unit sub-symbols are associated with (available to be displayed at) one, more or each of the symbol display positions of the reel game. In another embodiment wherein one or more collection units are displayed as one or more sub-symbols of a reel game, such collection unit symbols are associated with (i.e., available to be displayed with) one, more or each of the symbols of the reel game.

Following the accumulation of any collection units associated with the play of the primary game (i.e., following the occurrence of zero, one or more secondary event triggering unit accumulation events), the gaming system determines if any bonus game was triggered as indicated in diamond 110 of FIG. 1. R should be appreciated that unlike the below-described triggering of a secondary event (i.e., a designated secondary game or designated bonus game) based on the accumulation of collection units across multiple games played in association with a wager placed, the triggering of such bonus games (i.e., such non-designated bonus game or non-designated secondary games) occurs independent of any accumulated collection units reaching any threshold amounts.

In one embodiment, the gaming system triggers a play of a bonus game in association with one or more symbols, symbol combinations or other game elements displayed during the play of the wagered on primary game. In another embodiment, the gaming system triggers a play of a bonus game independent of any element displayed during the play of the wagered on primary game. In one such embodiment, no apparent reason is provided for triggering a play of a bonus game in association with or otherwise during the play of the primary game. That is, in this embodiment, triggering a play of a bonus game is not caused by the occurrence of an event in the primary game or based specifically on any play of the primary game. Rather, the triggering a play of a bonus game occurs without any explanation or, alternatively, with a simple explanation.

If the gaming system determines that at least one bonus game is triggered, for the play of each triggered bonus game, the gaming system determines and displays a bonus game outcome as indicated in block 112. The gaming system then determines and displays any bonus game award associated with the determined bonus game outcome as indicated in block 114.

Figure 2B:
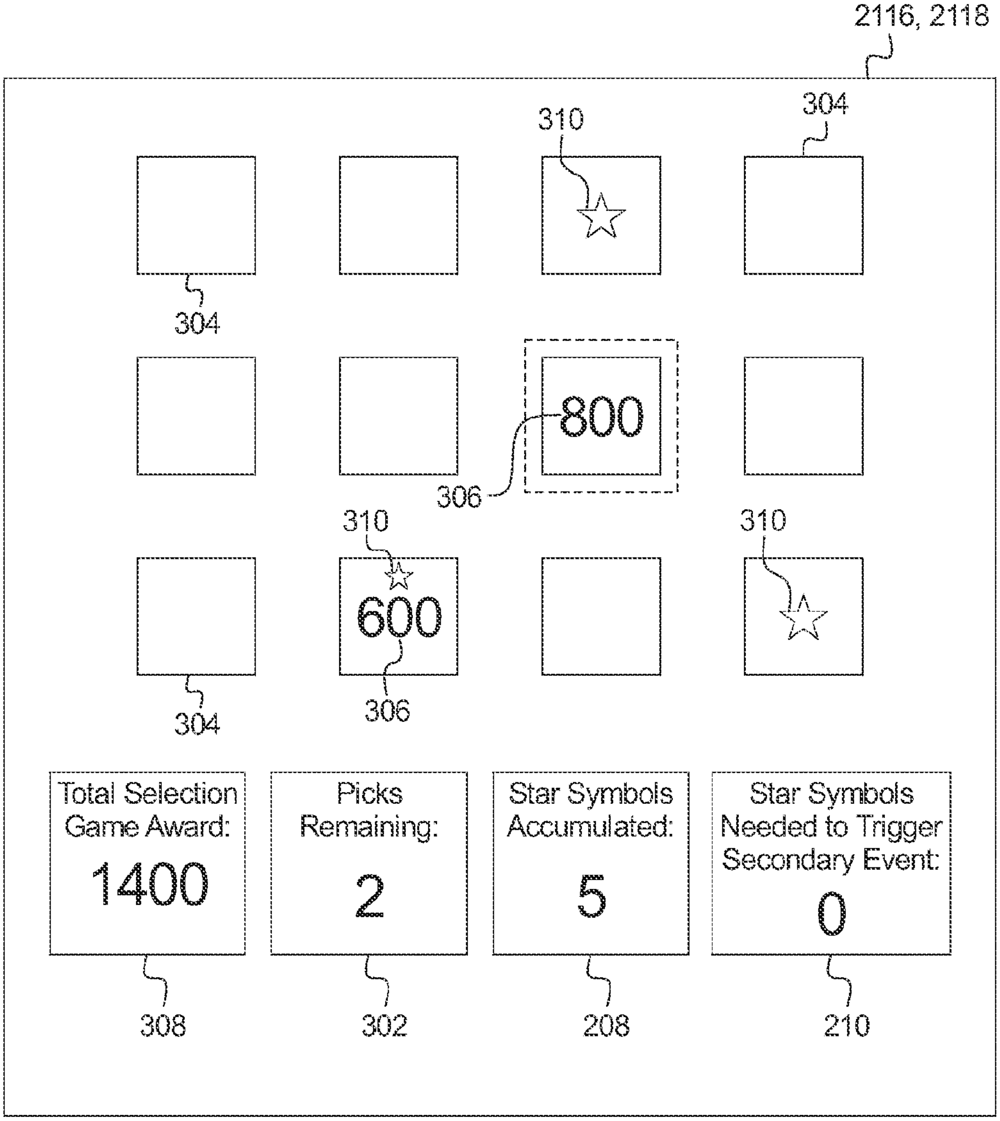

For example, as seen in FIG. 2B, the gaming system displays a selection game as a bonus game. In this selection game, the gaming system provides the player a quantity of picks (as indicated in the picks remaining indicator 302) and enables a player to pick a quantity of selections 304. The gaming system then displays the award 306 individually associated with each player picked selection as well as a total award for all of the player picked selections (as indicated in total selection game award indicator 308). Appropriate messages such as "YOUR SELECTION IS ASSOCIATED WITH AN AWARD OF 800. YOU HAVE TWO PICKS REMAINING. GOOD LUCK." may be provided to the player visually, or through suitable audio or audiovisual displays.

In addition to determining and displaying any bonus game award associated with the bonus game outcome for the play of the bonus game, the gaming system accumulates any collection units (i.e., secondary event triggering units) associated with the play of the bonus game as indicated in block 116 of FIG. 1.

In one embodiment, as described above with respect to accumulating any collection units in association with a play of a primary game, the gaming system accumulates one or more collection units independent of any element displayed during the play of the bonus game. In another embodiment, as described above with respect to accumulating any collection units in association with a play of a primary game, the gaming system accumulates one or more collection units in association with one or more symbols, symbol combinations or other game elements displayed during the play of the bonus game. In one such embodiment, the gaming system accumulates one collection unit in association with each of one or more symbols, symbol combinations or other game elements displayed during the play of the bonus game. In another such embodiment, the gaming system accumulates a plurality of collection units in association with each of one or more symbols, symbol combinations or other game elements displayed during the play of the bonus game.

For example, as seen in FIG. 2B, the gaming system displays three collection units 310 associated with three available selections 304 of the bonus game. In this example embodiment, the gaming system accumulates the three displayed collection units based on the player's picked selections and displays to the player both the quantity of collection units accumulated 208 and the quantity of collection units needed to still be accumulated to cause a triggering of a secondary event 210. Appropriate messages such as "YOU COLLECTED THREE MORE STAR SYMBOLS" may be provided to the player visually, or through suitable audio or audiovisual displays.

In one embodiment, as seen in FIG. 2B, the gaming system displays the association between one or more collection units and one or more selections. In another such embodiment, the gaming system masks or otherwise does not display the association between one or more collection units and one or more selections. In this embodiment, such an association is displayed upon the player picking a selection to reveal any award and/or any collection units associated with the player picked selection.

In one embodiment wherein one or more collection units are associated with one or more available selections of a selection game, the gaming system accumulates a collection unit upon the player picking the selection associated with that collection unit. That is, in certain embodiments, the gaming system requires a player to take an action to acquire or accumulate a collection unit. In one embodiment wherein one or more collection units are associated with one or more available selections of a selection game, the gaming system accumulates a collection unit regardless of the player picking the selection associated with that collection unit. That is, in certain embodiments, the gaming system requires a player to take no action to acquire or accumulate a collection unit.

Following the accumulation of any collection units associated with the play of the bonus game (i.e., following the occurrence of zero, one or more secondary event triggering unit accumulation events) or following the determination that no bonus game was triggered in association with the play of the primary game, as indicated in diamond 118 of FIG. 1, the gaming system determines whether to trigger a secondary event based on if a quantity of accumulated collection units reaches a threshold amount of collection units. That is, based on if a quantity of events which occur in association with one or more game states following the placement of a wager, the gaming system determines whether to unlock the play of a secondary event.

For example, as seen in FIG. 2B, since the threshold amount of collection units to accumulate to trigger the secondary event is five collection units and since the gaming system accumulated five collection units in association with the wagered on primary game and the bonus game triggered in association with the wagered on primary game, the gaming system triggers the secondary event. Appropriate messages such as "YOUR COLLECTION OF STAR SYMBOLS TRIGGERED A PLAY OF THE SUPER BONUS GAME" may be provided to the player visually, or through suitable audio or audiovisual displays.

For the play of the triggered secondary event, the gaming system determines and displays a secondary event outcome as indicated in block 120 of FIG. 1. The gaming system then determines and displays any secondary event award associated with the determined secondary event outcome as indicated in block 122.

Figure 2C:
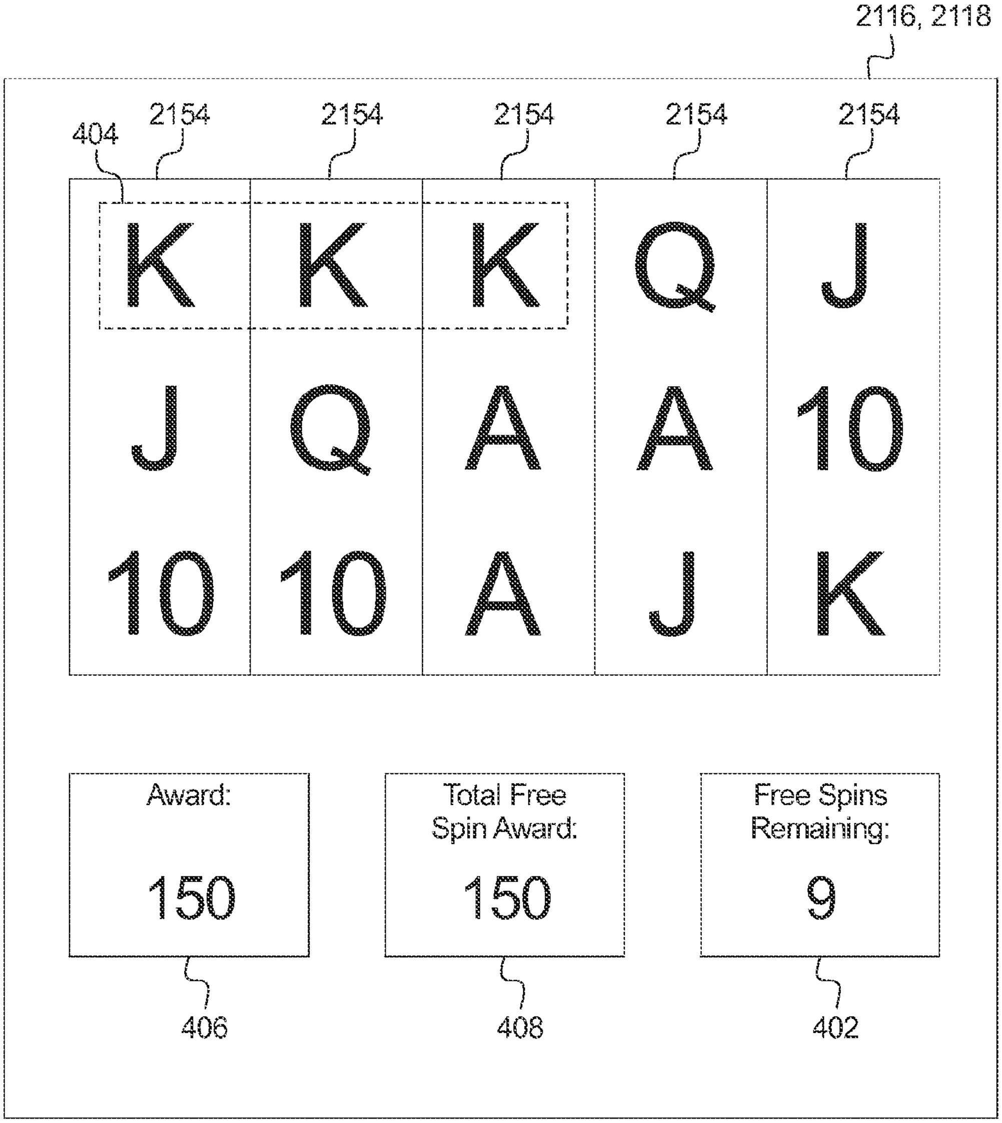

For example, as seen in FIG. 2C, the gaming system displays a free spins game as a secondary event. In this free spins game, the gaming system provides the play a quantity of free spins (as indicated in the free spins remaining indicator 402). For each free spin of the reels, the gaming system determines and displays a free spin game outcome, such as a symbol combination 404. For each free spin of the reels, the gaming system determines and displays any free spin award 406 associated with the displayed free spin game outcome as well as a total award for all of the free spins of the secondary event (as indicated in total free spins game award indicator 408). Appropriate messages such as "YOU WON TEN FREE SPINS IN THE SUPER BONUS GAME", and "YOU WIN $150.00 FOR YOUR THREE KING SYMBOL COMBINATION" may be provided to the player visually, or through suitable audio or audiovisual displays.

Following the play of a triggered secondary event or following the determination that no secondary event was triggered based on the quantity of accumulated collection units, the gaming system resets the quantity of accumulated collection units as indicated in block 124 of FIG. 1. The gaming system then awaits another placement of another wager to initiate another play of the primary game and another accumulation of collection units. It should be appreciated that in this embodiment, following the play of the primary game, any bonus games and/or any secondary events played at least partially in association with the play of the wagered on primary game, the gaming system resets a counter of accumulated collection units (Le., accumulated secondary event triggering units) to ensure that the persistence aspect of accumulating collection units is associated with the placement of the wager on the play of the primary game. Such a resetting of the quantity of accumulated collection units after the last game or event associated with a wager placed provides that, in certain embodiments, each wager placed is associated with a distinct accumulation of collection units towards a play of a secondary event. Accordingly, the gaming system disclosed herein provides a persistence collection aspect to any games which are played in association with a wager placed such that each of the games played or game states entered may potentially result in the triggering (Le., unlocking) of a previously unavailable secondary event.

In one embodiment, as illustrated in FIGS. 2A to 2C, as each award is determined for each play of each game or event (i.e., the primary game, any bonus game, and any secondary event) associated with the placed wager, the gaming system displays such determined award in association with the play of that game or event. In another embodiment, as each award is determined for each play of each game or event (i.e., the primary game, any bonus game, and any secondary event) associated with the placed wager, the gaming system does not display such determined award in association with the play of that game or event. Rather, in this embodiment, after the completion of the last game or event associated with the placed wager, the gaming system then displays each of the determined awards for each play of each of the games or events associated with the placed wager.

In one embodiment, the gaming system triggers a plurality of different bonus games in association with the play of the wagered on primary game. In one such embodiment, the gaming system sequentially plays each of the different triggered bonus games. In another such embodiment, the gaming system simultaneously or concurrently plays each of the different triggered bonus games.

In one embodiment, the gaming system triggers a plurality of plays of each of one or more bonus games in association with the play of the wagered on primary game. In one such embodiment, the gaming system sequentially plays each of the plays of the triggered bonus games. In another such embodiment, the gaming system simultaneously or concurrently plays each of the plays of the triggered bonus games.

In one embodiment, upon the accumulation of a quantity of collection units which reaches the threshold amount of collection units, the gaming system triggers the secondary event. In this embodiment, the gaming system pauses whichever game (e.g., the primary game or any bonus game) is currently being played and proceeds with the play of the triggered secondary event as described herein. In this embodiment, following the play of the triggered secondary event, the gaming system returns to the paused game. In another embodiment, upon the accumulation of a quantity of collection units which reaches the threshold amount of collection units, the gaming system triggers the secondary event. In this embodiment, the gaming system completes whichever game (e.g., the primary game or any bonus game) is currently being played and then proceeds with the play of the triggered secondary event as described herein. In this embodiment, following the play of the triggered secondary event, the gaming system initiates any remaining bonus games which would have been triggered but for the triggering of the secondary event.

It should be appreciated that in the embodiments of triggering the secondary event upon the accumulation of a quantity of collection units which reaches the threshold amount of collection units, since collection units are available to be accumulated in multiple different games associated with the wager placed, it is possible to have multiple triggerings of the secondary event. For example, following a first play of the secondary event, if the quantity of accumulated collection units is reset and another quantity of accumulated collection units reaches the threshold amount in any games which occur after the first play of the secondary event, the gaming system triggers another play of the secondary event. In another example, following a first play of the secondary event, if the quantity of accumulated collection units is not reset and the quantity of accumulated collection units reaches another threshold amount in any games which occur after the first play of the secondary event, the gaming system triggers another play of the secondary event. In variations of this example, any play of the secondary event which occurs following the quantity of collection units reaching the other threshold amount has the same or a different average expected payout.

In another embodiment, the gaming system plays each of the primary game and any bonus games to completion and then determines if the secondary event is triggered based on the quantity of accumulated collection units relative to a threshold amount of collection units. In this embodiment, since the secondary event is not triggered until after completion of the other games, it is possible to accumulate a quantity of collection units exceeding the threshold quantity of collection units. In one such embodiment, the gaming system determines an average expected payout of the secondary event based on the quantity of collection units accumulated when the secondary event is triggered. In one such embodiment, the greater the quantity of accumulated collection units when the secondary event is triggered, the greater the average expected payout of the secondary event. In certain embodiments, the gaming system utilizes one or more features to modify the average expected payout of the secondary event. In these embodiments, the gaming system determines which features to utilize based on the quantity of collection units accumulated. For example, the gaming system triggers the play of the secondary event utilizing one set of reels if a first quantity of collection units are accumulated. In this example, the gaming system triggers the play of the secondary event utilizing two sets of reels if a second quantity of collection units are accumulated. In this example, the gaming system triggers the play of the secondary event utilizing three sets of reels if a third quantity of collection units are accumulated.

In one embodiment, in addition to determining and displaying any secondary event award associated with the secondary event outcome for the play of the secondary event, the gaming system accumulates any collection units associated with the play of the secondary event. In one embodiment, as described above with respect to accumulating any collection units in association with a play of a primary game, the gaming system accumulates one or more collection units independent of any element displayed during the play of the secondary event. In another embodiment, as described above with respect to accumulating any collection units in association with a play of a primary game, the gaming system accumulates one or more collection units in association with one or more symbols, symbol combinations or other game elements displayed during the play of the secondary event. In one such embodiment, the gaming system accumulates one collection unit in association with each of one or more symbols, symbol combinations or other game elements displayed during the play of the secondary event. In another such embodiment, the gaming system accumulates a plurality of collection units in association with each of one or more symbols, symbol combinations or other game elements displayed during the play of the secondary event.

Figure 2D:
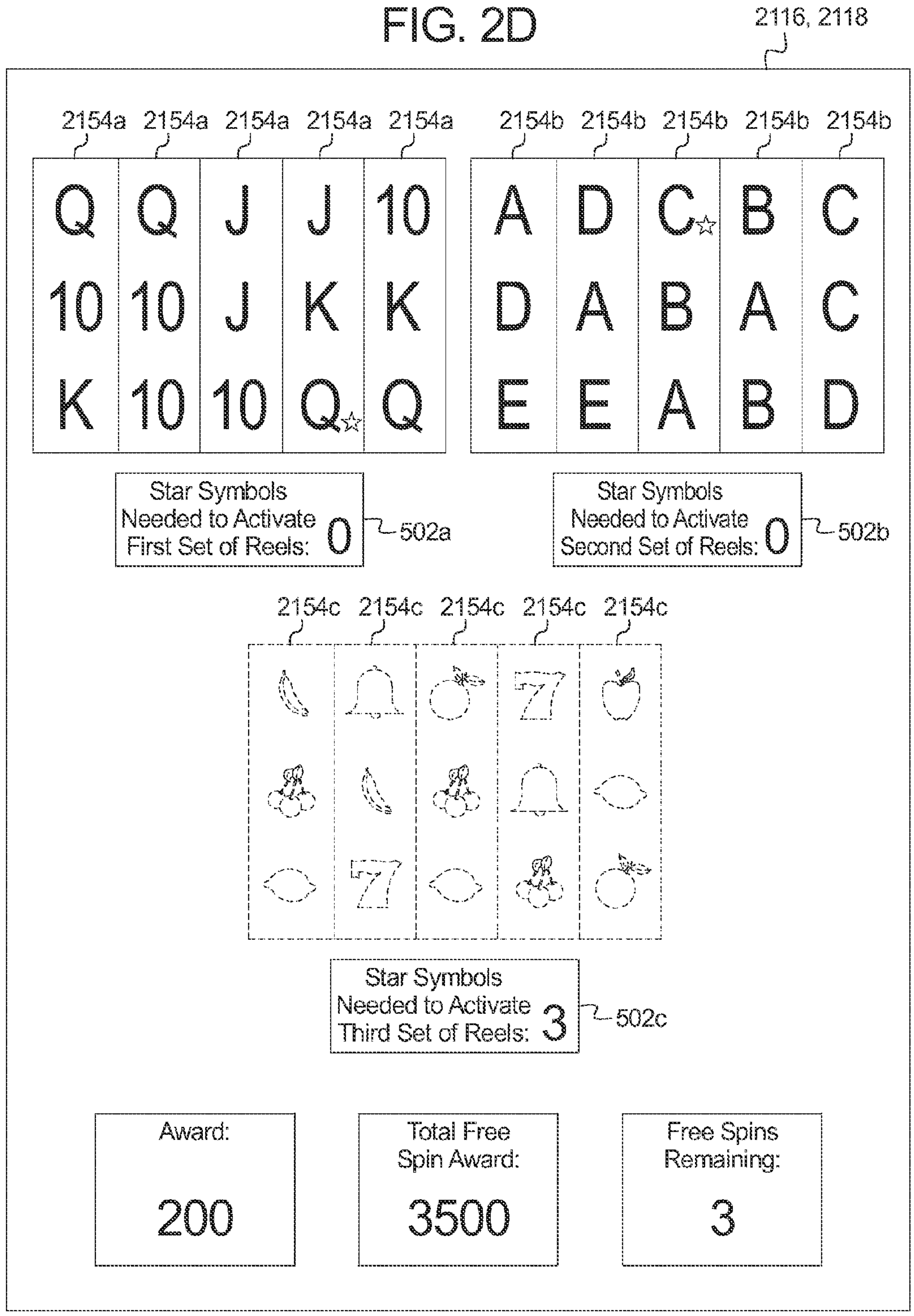

In one embodiment, if the quantity of collection units accumulated reaches one or more additional threshold amounts, the gaming system modifies an average expected payout of the secondary event or a remaining portion of the secondary event. In certain embodiments, the gaming system utilizes one or more features to modify the average expected payout of the secondary event or a remaining portion of the secondary event. In these embodiments, the gaming system determines which features to utilize based on the quantity of collection units accumulated. For example, the gaming system triggers the play of the secondary event utilizing one set of reels if a first quantity of collection units are accumulated. In this example, if enough collection units are accumulated during the play of the secondary event to reach a second threshold amount, for any remaining free spins of the secondary event, the gaming system utilizes two sets of reels. In this example, if enough collection units are accumulated during the play of the secondary event to reach a third threshold amount, for any remaining free spins of the secondary event, the gaming system utilizes three sets of reels. FIG. 2D illustrates a point in time of the free spin secondary event in which the quantity of accumulated collection units has exceeded the first threshold amount 502*a* (thus activating the first set of reels 2154*a*), the quantity of accumulated collection units has exceeded the second threshold amount 502*b* (thus activating the second set of reels 2154*b*) and two collection units are needed to reach the third threshold amount 503*c* (and thus activate the third set of reel 2154*c* which are currently inactive as indicated by the dashed lines). Appropriate messages such as "COLLECT THREE MORE STAR SYMBOLS TO UNLOCK THE THIRD SET OF REELS FOR ANY REMAINING FREE SPINS" may be provided to the player visually, or through suitable audio or audiovisual displays.

In this example embodiment, each addition reel set is associated with different symbols associated with different awards such that the average expected payout of the secondary game is modified based on the employment of these additional reel sets. For example, the first reel set is associated with an average expected payout of $1.00 for each $1.00 wagered, the second reel set is associated with an average expected payout of $2.00 for each $1.00 wagered, and the third reel set is associated with an average expected payout of $3.00 for each $1.00 wagered. In this example, when only the first reel set is activated, each spin of the then activated reels of the secondary event is associated with an average expected payout of $1.00 per $1.00 wagered. In this example, when both the first reel set and the second reel set are activated, each spin of the then activated reels of the secondary event is associated with an average expected payout of $1.50 per $1.00 wagered. In this example, when each of the first reel set, the second re& set and the third reel set are activated, each spin of the then activated reels of the secondary event is associated with an average expected payout of $2.00 per $1.00 wagered. As illustrated by this example, each addition reel set activated (i.e., each additional feature employed) modifies the average expected payout of the secondary game.

In one embodiment employing a multi-stage secondary event, such as a secondary event employing a plurality of reel sets, the gaming system determines and displays outcomes and associated awards with each of the reel sets (i.e., both locked or activated reel sets and unlocked or inactive reel sets) for each award determination during the play of the secondary event.

In one such embodiment, as each of any locked reel sets become unlocked or activated based on the accumulation of collection units as described herein, the gaming system unlocks the awards previously determined and displayed in association with that reel set. The gaming system of this embodiment unlocks and provides zero, one or more past awards previously determined in association with a locked reel set when the gaming system unlocks that reel set. That is, as each reel set becomes activated or unlocked during the play of the secondary event (i.e., as each stage of the secondary event is advanced to), the gaming system provides the player future awards associated with that reel set and any past awards associated with that reel set.

In another embodiment employing a multi-stage secondary event, such as a secondary event employing a plurality of reel sets, as each of any locked reel sets become unlocked or activated based on the accumulation of collection units as described herein, the gaming system does not provide the awards previously determined and displayed in association with that reel set. In this embodiment, as each reel set becomes unlocked or activated during the play of the secondary event (i.e., as each stage of the secondary event is advanced to), the gaming system provides the player future awards associated with that reel set, but not any past awards associated with that reel set.

In one embodiment employing a multi-stage secondary event, such as a secondary event employing a plurality of reel sets, the gaming system accumulates collection units in association with unlocked reel sets during the play of the secondary event. In another such embodiment, the gaming system accumulates collection units in association with unlocked reel sets and locked reel sets during the play of the secondary event.

In one embodiment, the gaming system triggers a play of a secondary event if one type of collection unit reaches a threshold amount. In another embodiment, the gaming system triggers a play of a secondary event if a plurality of different collection units or different types of collection units reach a threshold amount. In one such embodiment, the multiple different collection units or different types of collections units are accumulated toward a single threshold amount. In another such embodiment, each different collection unit or different type of collection unit is associated with a different threshold amount for that collection unit. In different embodiments, one, more or each of the different threshold amounts are required to be reached to trigger the secondary event.

In another embodiment, the gaming system includes a plurality of different collection units or different types of collection units, wherein the gaming system simultaneously accumulates one or more of the different collection units or different types of collection units. In one embodiment, one, more or each of the different collection units or different types of collection units are associated with a different threshold amount. In one such embodiment, if the threshold amount is reached for one, more or each of the different collection units or different types of collection units, the gaming system triggers a secondary event. In another embodiment, each different collection unit or different type of collection unit is associated with an individual secondary event. In this embodiment, if the threshold amount is reached for an individual one of the different collection units or different types of collection units, the gaming system triggers the individual secondary event associated with that different collection unit or different type of collection unit.

It should be appreciated that while FIG. 2A illustrates an example primary game as a slot or reel game, while FIG. 2B illustrates an example bonus game as a selection game, while FIG. 2C illustrates an example secondary event as a free spin game, and while FIG. 2D illustrates an example secondary event as a free spin game employing selectively activated multiple reel sets, the gaming system disclosed herein is configured to implement any suitable game as one or more primary games, one or more bonus games and the secondary event. In different embodiments, such primary games, bonus games and secondary events include, but are not limited to:

i. a play of any suitable slot game;
ii. a play of any suitable free spins or free game activations;
iii. a play of any suitable wheel game;
iv. a play of any suitable card game;
v. a play of any suitable offer and acceptance game;
vi. a play of any suitable award ladder game;
vii. a play of any suitable puzzle-type game;
viii. a play of any suitable persistence game;
ix. a play of any suitable selection game;
x. a play of any suitable cascading symbols game;
xi. a play of any suitable ways to win game;
xii. a play of any suitable scatter pay game;
xiii. a play of any suitable coin-pusher game;
xiv. a play of any suitable elimination game;
xv. a play of any suitable stacked wilds game;
xvi. a play of any suitable trail game;
xvii. a play of any suitable bingo game;
xviii. a play of any suitable video scratch-off game;
xix. a play of any suitable pick-until-complete game;
xx. a play of any suitable shooting simulation game;
xxi. a play of any suitable racing game;
xxii. a play of any suitable promotional game;
xxiii. a play of any suitable high-low game;
xxiv. a play of any suitable lottery game;
xxv. a play of any suitable number selection game;
xxvi. a play of any suitable dice game;
xxvii. a play of any suitable skill game;
xxviii. a play of any suitable auction game;
xxix. a play of any suitable reverse-auction game;
xxx. a play of any suitable group game;
xxxi. a play of any suitable game in a service window;
xxxii. a play of any suitable game on a mobile device; and/or
xxxiii. a play of any suitable game disclosed herein.

In another embodiment, the play of the primary game, the play of any bonus games and the play of the secondary event includes the activation of zero, one or more features including, but are not limited to:

i. a wild symbols feature;
ii. a book-end wild symbols feature;
iii. a stacked wild symbols feature;
iv. an expanding wild symbols feature;
v. a wild reel feature;
vi. a retrigger symbol feature;
vii. an anti-terminator symbol feature;
viii. a locking reel feature,
ix. a locking symbol position feature;
x. a modifier, such as a multiplier, feature;
xi. a feature modifying an amount of credits of a credit balance;
xii. a feature modifying an amount of promotional credits;
xiii. a feature modifying a placed wager amount;
xiv. a feature modifying a wager amount available to be placed;
xv. a feature modifying a placed side wager amount;
xvi. a feature modifying a side wager amount available to be placed;
xvii. a feature modifying a rate of earning player tracking points;
xviii. a feature modifying a number of wagered on paylines;
xix. a feature modifying a number of paylines available to be wagered on;
xx. a feature modifying a wager placed on one or more paylines (or on one or more designated paylines);
xxi. a feature modifying a number of ways to win wagered on;
xxii. a feature modifying a number of available ways to win to be wagered on;
xxiii. a feature modifying a wager placed on one or more ways to win (or on one or more designated ways to win);
xxiv. a feature modifying a paytable utilized for a play of a game;
xxv. a feature modifying an average expected payback percentage of a play of a game;
xxvi. a feature modifying an average expected payout of a play of a game;
xxvii. a feature modifying one or more awards available;
xxviii. a feature modifying a range of awards available;
xxix. a feature modifying a type of awards available;
xxx. a feature modifying one or more progressive awards;
xxxi. a feature modifying which progressive awards are available to be won;
xxxii. a feature modifying one or more modifiers, such as multipliers, available;
xxxiii. a feature modifying an activation of a re& (or a designated reel);
xxxiv. a feature modifying an activation of a plurality of reels;
xxxv. a feature modifying a generated outcome (or a designated generated outcome);
xxxvi. a feature modifying a generated outcome (or a designated generated outcome) associated with an award over a designated value;
xxxvii. a feature modifying a generated outcome (or a designated generated outcome) on a designated payline;
xxxviii. a feature modifying a generated outcome (or a designated generated outcome) in a scatter configuration;
xxxix. a feature modifying a winning way to win (or a designated winning way to win);
xl. a feature modifying a designated symbol or symbol combination;
xli. a feature modifying a generation of a designated symbol or symbol combination on a designated payline;
xlii. a feature modifying a generation of a designated symbol or symbol combination in a scatter configuration;
xliii. a feature modifying a triggering event of a play of a secondary or bonus game;
xliv. a feature modifying an activation of a secondary or bonus display (such as an award generator);
xlv. a feature modifying a quantity of activations of a secondary or bonus display (e.g., a feature modifying a quantity of spins of an award generator);
xlvi. a feature modifying a quantity of sections of a secondary or bonus display (e.g., a feature modifying a quantity of sections of an award generator);
xlvii. a feature modifying one or more awards of a secondary or bonus display;
xlviii. a feature modifying an activation of a community award generator;

xlix. a feature modifying a quantity of activations of a community award generator;

l. a feature modifying a quantity of sections of a community award generator;

li. a feature modifying one or more awards of a community award generator;

lii. a feature modifying a generated outcome (or a designated generated outcome) in a secondary event;

liii. a feature modifying a quantity of picks in a selection game;

liv. a feature modifying a quantity of offers in an offer and acceptance game;

lv. a feature modifying a quantity of moves in a trail game;

lvi. a feature modifying an amount of free spins provided;

lvii. a feature modifying a game terminating or ending condition;

lviii. a feature modifying how one or more aspects of one or more games (e.g., colors, speeds, sound) are displayed to a player;

lix. a feature modifying access to different websites a player may access via a mobile device;

lx. a feature modifying audio-visual content a player may access via a mobile device;

lxi. a feature modifying a player's avatar; and/or lxii. a feature modifying any game play feature associated with any play of any game disclosed herein.

In different embodiments, one or more awards provided in association with one or more games played include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of at least one electronic gaming machine to display any games played. In another embodiment, in addition or in alternative to each electronic gaming machine displaying any games played, the gaming system causes one or more community or overhead display devices to display part or all of any games played to one or more other players or bystanders either at a gaming establishment or viewing over a network, such as the internet. In another embodiment, in addition or in alternative to each electronic gaming machine displaying any games played, the gaming system causes one or more internet sites to each display any games played such that a player is enabled to log on from a personal web browser. In another such embodiment, the gaming system enables the player to play one or more games on one device while viewing any games played from another device, such as a desktop or laptop computer.

In one embodiment, as described above, the gaming system causes a secondary event triggering unit accumulation event to occur based on (or as a result of) one or more displayed events occurring in association with one or more plays of one or more games. In another embodiment, the gaming system causes a secondary event triggering unit accumulation event to occur independent of any displayed events associated with any plays of any games.

In different embodiments, a secondary event triggering unit accumulation event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of one or more games causes such conditions to be satisfied and/or one or more of such events to occur.

In different embodiments, the gaming system does not provide any apparent reasons to the players for an occurrence of a secondary event triggering unit accumulation event. In these embodiments, such determinations are not triggered by an event in a primary game or based specifically on any of the plays of any primary games. That is, these events occur without any explanation or alternatively with simple explanations.

In one such embodiment, a secondary event triggering unit accumulation event alternatively occurs based on an amount of coin-in. In this embodiment, the gaming system determines if an amount of coin-in wagered reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a secondary event triggering unit accumulation event alternatively occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a secondary event triggering unit accumulation event alternatively occurs based on an amount of coin-out. In this embodiment, the gaming system determines if an amount of coin-out reaches or exceeds a designated amount of coin-out (Le., a threshold coin-out amount). Upon the amount of coin-out reaching or exceeding the threshold coin-out amount, the gaming system causes one or more of such events or conditions to occur. In another such embodiment, a secondary event triggering unit accumulation event alternatively occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a secondary event triggering unit accumulation event alternatively occurs based on a predefined variable reaching a defined parameter threshold. For example, when the 500,000$^{th}$ player has played an electronic gaming machine (ascertained from a player tracking system), one or more of such events or conditions occur. In different embodiments, the predefined parameter thresholds include a length of time, a length of time after a certain dollar amount is hit, a wager level threshold for a specific device (which electronic gaming machine is the first to contribute $250,000), a number of electronic gaming machines active, or any other parameter that defines a suitable threshold.

In different embodiments, a secondary event triggering unit accumulation event alternatively occurs based on a quantity of games played. In this embodiment, a quantity of games played is set for when one or more of such events or conditions will occur. In one embodiment, such a set quantity of games played is based on historic data.

In different embodiments, a secondary event triggering unit accumulation event alternatively occurs based on time. In this embodiment, a time is set for when one or more of such events or conditions will occur. In one embodiment, such a set time is based on historic data.

In different embodiments, a secondary event triggering unit accumulation event alternatively occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the electronic gaming machine. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a secondary event triggering unit accumulation event alternatively occurs based on a system determination, including one or more random selections by the central controller. In one embodiment, as described above, the gaming system tracks all active electronic gaming machines and the wagers they placed. In one such embodiment, based on the electronic gaming machine's state as well as one or more wager pools associated with the electronic gaming machine, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a secondary event triggering unit accumulation event alternatively occurs based on a determination of if any numbers allotted to an electronic gaming machine match a randomly selected number. In this embodiment, upon or prior to each play of each electronic gaming machine, an electronic gaming machine selects a random number from a range of numbers and during each primary game, the electronic gaming machine allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a secondary event triggering unit accumulation event to occur may be implemented in accordance with the gaming system and method disclosed herein.

In different embodiments, a secondary event triggering unit accumulation event occurs and one or more collection units (Le., secondary event triggering units) are accumulated based on, but not limited to, one or more of:

i. a deposit of an amount of funds;
ii. an identification of a player (or a designated player);
iii. any player (or a designated player) placing a wager (regardless of the wager amount);
iv. any player (or a designated player) placing a side-wager (regardless of the side-wager amount);
v. any player (or a designated player) wagering on a number of paylines;
vi. any player (or a designated player) wagering on a designated payline;
vii. any player (or a designated player) wagering on a number of ways to win;
viii. any player (or a designated player) engaging an input device to cause a generation of an outcome;
ix. an activation of a reel (or a designated reel):
x. an activation of a plurality of reels;
xi. a generation of any outcome (or a designated outcome);
xii. a generation of any outcome (or a designated outcome) associated with an award;
xiii. a generation of any outcome (or a designated outcome) associated with an award over a designated value;
xiv. a generation of an outcome (or a designated outcome) on a designated payline;
xv. a generation of an outcome (or a designated outcome) in a scatter configuration;
xvi. a generation of a winning way to win (or a designated winning way to win):
xvii. a generation of a designated symbol or symbol combination;
xviii. a generation of a designated symbol or symbol combination on a designated payline;

xix. a generation of a designated symbol or symbol combination in a scatter configuration;

xx. a triggering of a play of a bonus game;

xxi. an activation of a secondary display;

xxii. an activation of a community award generator;

xxiii. a generation of any outcome (or a designated outcome) in a bonus game;

xxiv. any player (or a designated player) engaging an input device to make a selection in a game;

xxv. an amount of free spins provided;

xxvi. an amount of time elapsed;

xxvii. any suitable event which occurs in association with a player's gaming experience.

It should be appreciated that in as stated above embodiment, a secondary event triggering unit accumulation event may be any suitable event which occurs in association with: (a) a play of a wagered on primary game, (b) one or more plays of one or more bonus games, (c) one or more play of one or more secondary events, or (d) one or more occurrences which are independent of the play of the wagered on primary game, any play of any bonus game, and any play of any secondary event. Accordingly, in various embodiments, any event which occurs and/or any action of a player in association with any game states attributed to the player's primary game wager may lead to the triggering of a secondary event.

It should be appreciated that one or more of the above-described triggers pertaining to a secondary event triggering unit accumulation event occurring may be combined in one or more different embodiments.

Alternative Embodiments

It should be appreciated that in different embodiments, one or more of:

(i) a quantity of collection units to accumulate in association with a play of a primary game;

(ii) how one or more collection units are accumulated in association with a play of a primary game;

(iii) which events of a play of a primary game are associated with an accumulation of one or more collection units;

(iv) a type of primary game played;

(v) a quantity of collection units to accumulate in association with one or more plays of one or more bonus games;

(vi) how one or more collection units are accumulated in association with one or more plays of one or more bonus games;

(vii) which events of a play of a bonus game are associated with an accumulation of one or more collection units;

(viii) a type of bonus game played;

(ix) a quantity of collection units to accumulate in association with a play of a secondary event;

(x) how one or more collection units are accumulated in association with a play of a secondary event;

(xi) which events of a play of a secondary event are associated with an accumulation of one or more collection units;

(xii) a type of secondary event played;

(xiii) which features, if any, to utilize in any games played;

(xiv) a threshold quantity of collection units required to be collected to trigger a secondary event;

(xv) one or more paytables utilized for a play of one or more games;

(xvi) one or more average expected payout percentages of a play of one or more games;

(xvii) one or more awards available for a play of one or more games;

(xviii) one or more ranges of awards available for a play of one or more games;

(xix) one or more types of awards available for a play of one or more games;

(xx) one or more generated outcomes (or one or more designated generated outcomes) for a play of one or more games; and/or (xxi) any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

Figure 3:
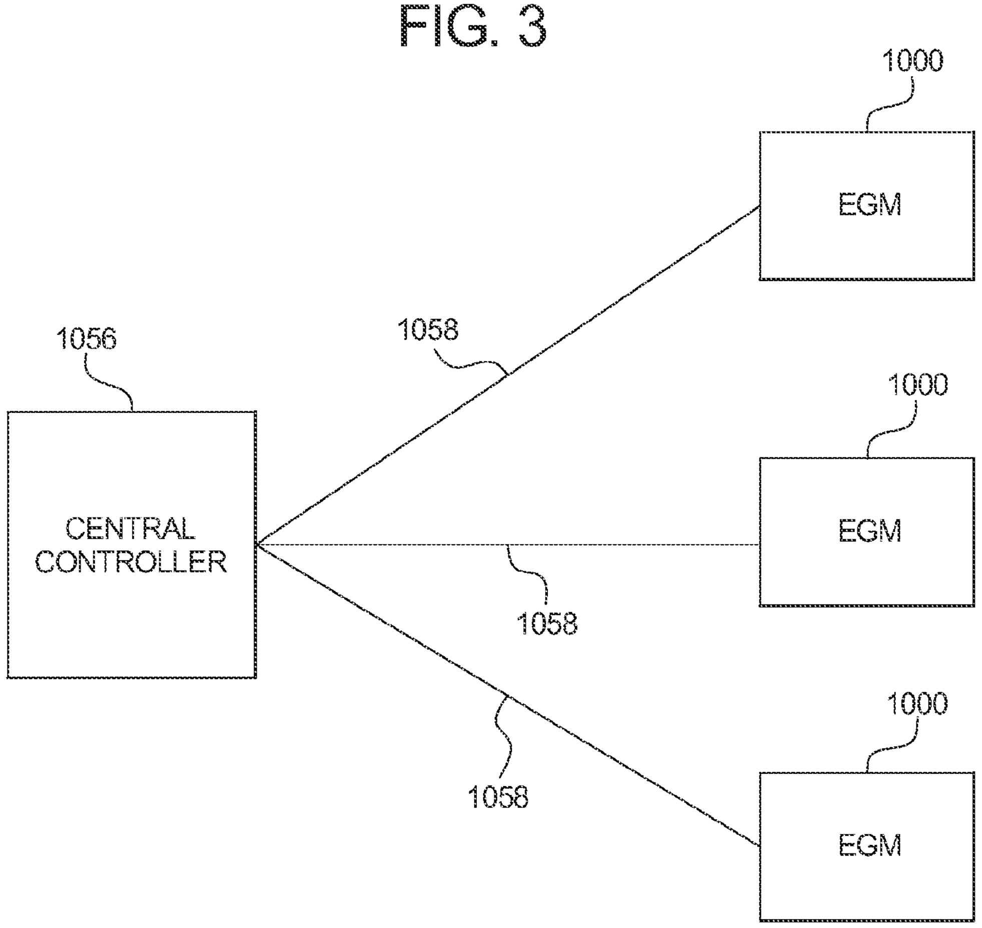
FIG. 3 is a schematic block diagram of one embodiment of a network configuration of the gaming system disclosed herein.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 3 includes a plurality of EGMs 1000 that are each configured to communicate with a central server, central controller, or remote host 1056 through a data network 1058.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
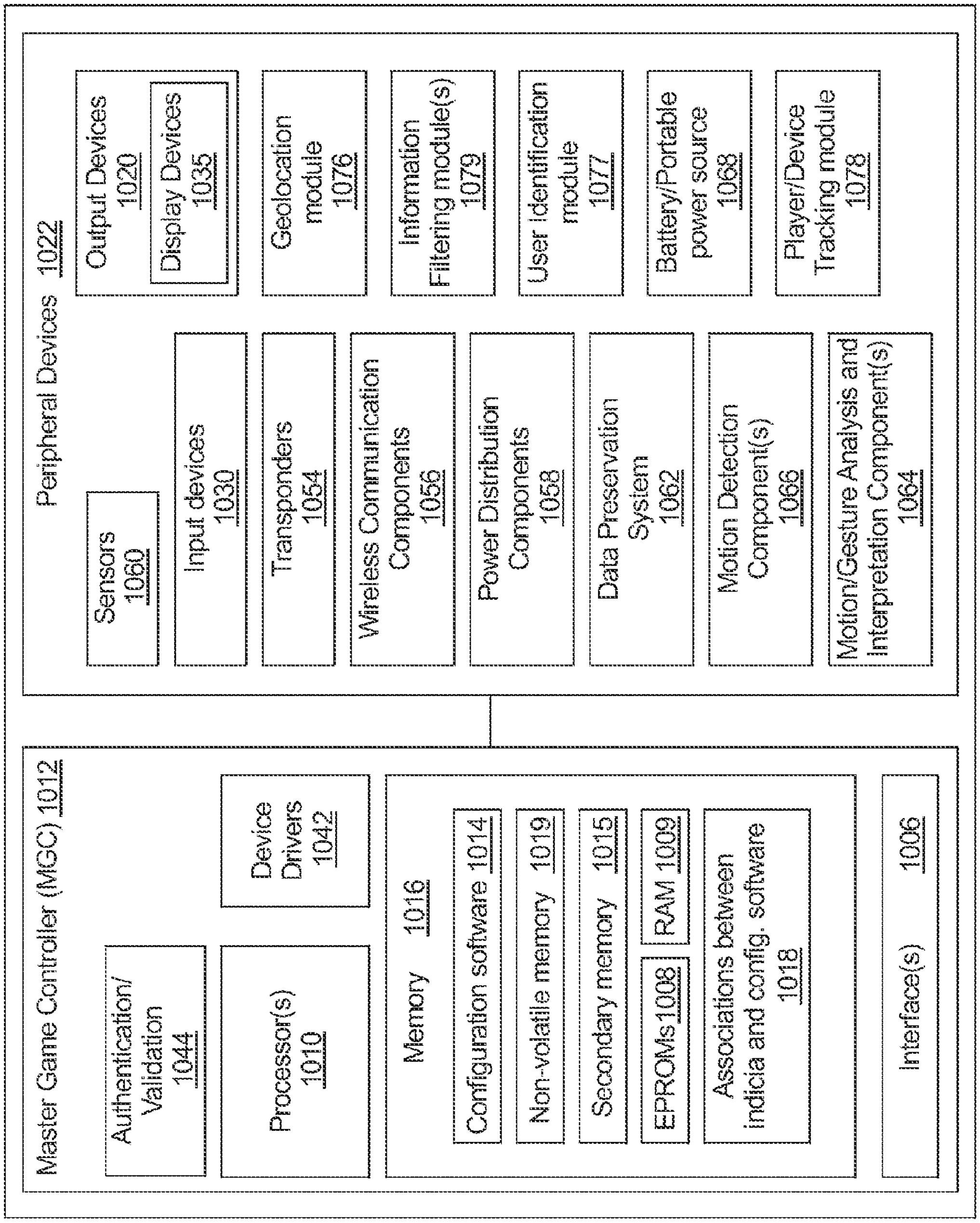
FIG. 4 is a schematic block diagram of one embodiment of an electronic configuration of an example gaming system disclosed herein.
Figure 5A:
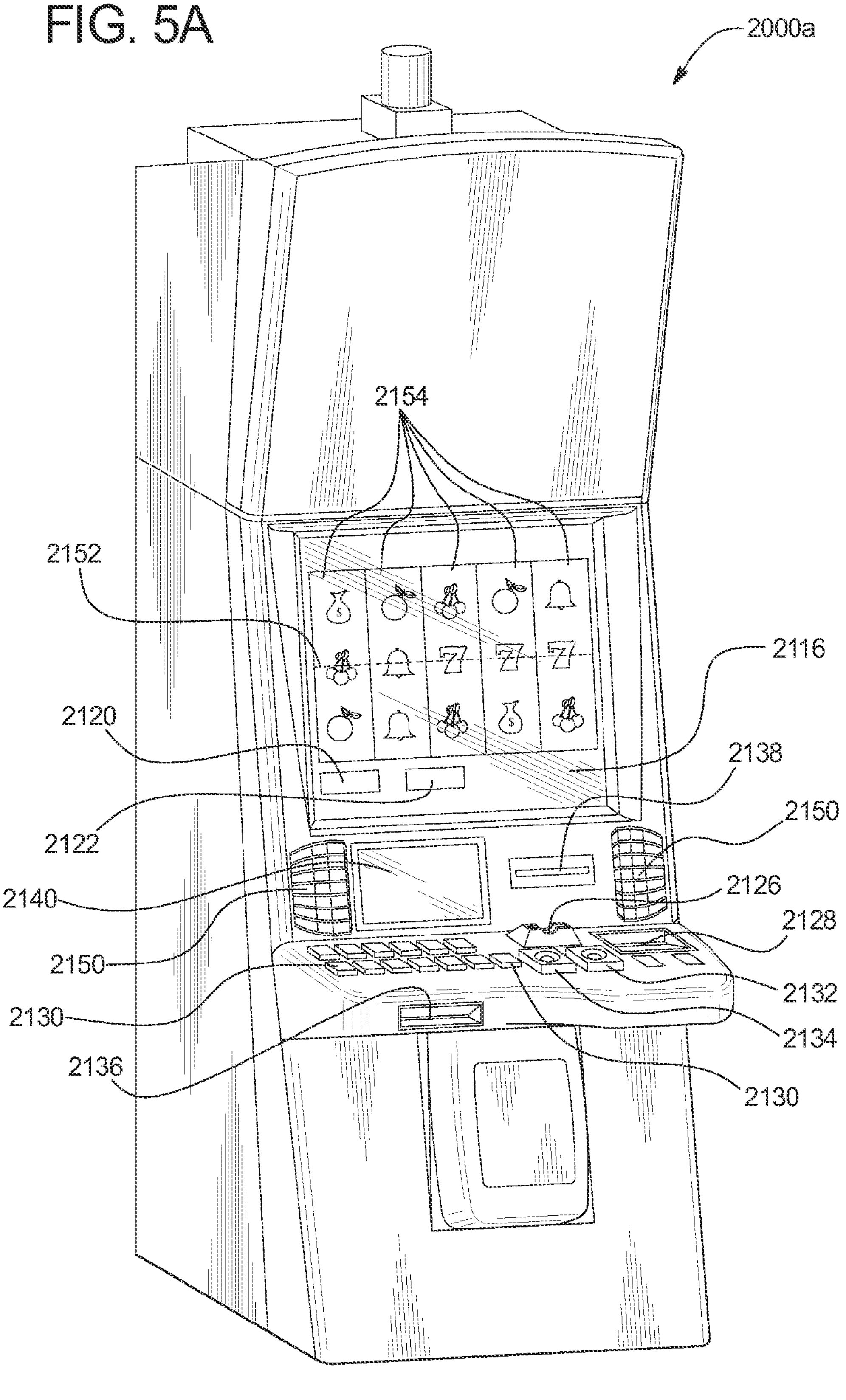
FIGS. 5A and 5B are perspective views of example alternative embodiments of the gaming system disclosed herein.
Figure 5B:
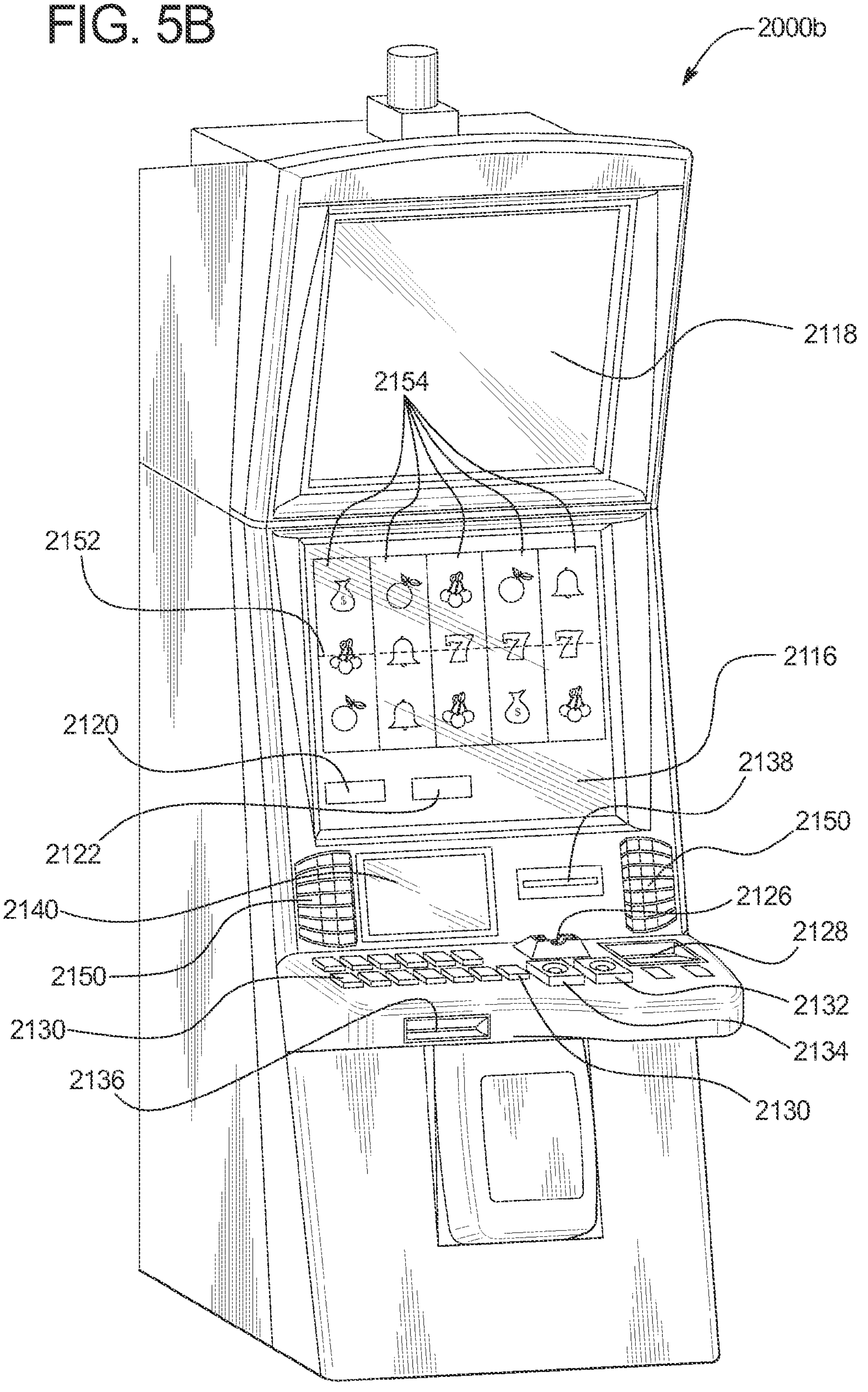

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperian/2, HomeRF, etc.) configured to enable the EGM to communicate with local and non-local devices using such protocols. In one implementation, the master gaming controller 1012 communicates with other devices using a serial communication protocol A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (h) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrates in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 5B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases. EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc, in addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example. IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

a plurality of input devices including an acceptor;

at least one processor; and at least one memory device which stores a plurality of instructions, which when executed by the at least one processor, cause the at least one processor to:

responsive to a physical item being received via the acceptor, establish a credit balance based, at least in part, on a monetary value associated with the received physical item, receive, via at least one of the input devices, a wager placed in association with a play of a primary game, said credit balance being decreasable based on the placed wager, for the play of the primary game:

determine a primary game outcome, cause the at least one display device to display the determined primary game outcome, determine any primary game award associated with the determined primary game outcome, and cause the at least one display device to display any determined primary game award associated with the determined primary game outcome, said credit balance being increasable based on any determined primary game award associated with the determined primary game outcome, accumulate any secondary event triggering units associated with the play of the primary game, responsive to a bonus game being triggered in association with the play of the primary game, for a play of the triggered bonus game:

determine a bonus game outcome, cause the at least one display device to display the determined bonus game outcome, determine any bonus game award associated with the determined bonus game outcome, and cause the at least one display device to display any determined bonus game award associated with the determined bonus game outcome, accumulate any secondary event triggering units associated with the play of the bonus game, independent of if a secondary event triggering unit is accumulated in association with the play of the primary game or in association with the triggered play of the bonus game, responsive to at least a first quantity of secondary event triggering units being accumulated, trigger a play of a secondary event, for the triggered play of the secondary event:

determine a secondary event outcome, cause the at least one display device to display the determined secondary event outcome, determine any secondary event award associated with the determined secondary event outcome, and cause the at least one display device to display any determined secondary event award associated with the determined secondary event outcome, and responsive to a cashout input being received via a cashout device, cause an initiation of any payout associated with the credit balance.

2. The gaming system of claim 1, wherein when executed by the at least one processor, the plurality of instructions cause the at least one processor to reset the quantity of accumulated secondary event triggering units prior to another wager being placed in association with another play of the primary game.

3. The gaming system of claim 1, wherein at least one secondary event triggering unit is accumulated in association with at least one of the play of the primary game based on the displayed primary game outcome.

4. The gaming system of claim 3, wherein at least one secondary event triggering unit is accumulated in association with at least one of the triggered play of the bonus game based on the displayed bonus game outcome.

5. The gaming system of claim 1, wherein when executed by the at least one processor, the plurality of instructions cause the at least one processor to:

(i) trigger a first play of the secondary event associated with a first average expected payout responsive to the first quantity of secondary event triggering units being accumulated, and (ii) trigger a second play of the secondary event associated with a second, different average expected payout responsive to a second, different quantity of secondary event triggering units being accumulated.

6. The gaming system of claim 1, wherein when executed by the at least one processor, the plurality of instructions cause the at least one processor to:

(i) accumulate any secondary event triggering units associated with the play of the secondary event, (ii) modify an average expected payout of at least a portion of the play of the secondary event responsive to a second, different quantity of secondary event triggering units being accumulated, wherein said second quantity of secondary event triggering units are accumulated in association with at least one of: the play of the primary game, the play of the bonus game, and the play of the secondary event.

7. The gaming system of claim 1, wherein at least one of: any determined primary game award, any determined bonus game award and any determined secondary event award is selected from the group of: a quantity of monetary credits, a quantity of non-monetary credits, a quantity of promotional credits, and a quantity of player tracking points.

8. A gaming system server comprising:

at least one processor; and at least one memory device which stores a plurality of instructions, which when executed by the at least one processor, cause the at least one processor to:

receive data associated with a wager placed in association with a play of a primary game, wherein a credit balance is decreasable based on the placed wager, said credit balance being increasable via an acceptor of a physical item associated with a monetary value, and said credit balance being decreasable via a cashout device configured to receive an input to cause an initiation of a payout associated with the credit balance, for the play of the primary game:

determine a primary game outcome, communicate data which results in at least one display device displaying the determined primary game outcome, determine any primary game award associated with the determined primary game outcome, and communicate data which results in the at least one display device displaying any determined primary game award associated with the determined primary game outcome, said credit balance being increasable based on any determined primary game award associated with the determined primary game outcome, accumulate any secondary event triggering units associated with the play of the primary game, responsive to a bonus game being triggered in association with the play of the primary game, for a play of the triggered bonus game:

determine a bonus game outcome, communicate data which results in the at least one display device displaying the determined bonus game outcome, determine any bonus game award associated with the determined bonus game outcome, and communicate data which results in the at least one display device displaying any determined bonus game award associated with the determined bonus game outcome, accumulate any secondary event triggering units associated with the triggered play of the bonus game, independent of if a secondary event triggering unit is accumulated in association with the play of the primary game or in association with the triggered play of the bonus game, responsive to at least a first quantity of secondary event triggering units being accumulated, trigger a play of a secondary event, and for the triggered play of the secondary event:

determine a secondary event outcome, communicate data which results in the at least one display device displaying the determined secondary event outcome, determine any secondary event award associated with the determined secondary event outcome, and communicate data which results in the at least one display device displaying any determined secondary event award associated with the determined secondary event outcome.

9. The gaming system server of claim 8, wherein when executed by the at least one processor, the plurality of instructions cause the at least one processor to reset the quantity of accumulated secondary event triggering units prior to another wager being placed in association with another play of the primary game.

10. The gaming system server of claim 8, wherein at least one secondary event triggering unit is accumulated in association with at least one of the play of the primary game based on the displayed primary game outcome.

11. The gaming system server of claim 10, wherein at least one secondary event triggering unit is accumulated in association with at least one of the triggered play of the bonus game based on the displayed bonus game outcome.

12. The gaming system server of claim 8, wherein when executed by the at least one processor, the plurality of instructions cause the at least one processor to:

(i) trigger a first play of the secondary event associated with a first average expected payout responsive to the first quantity of secondary event triggering units being accumulated, and (ii) trigger a second play of the secondary event associated with a second, different average expected payout responsive to a second, different quantity of secondary event triggering units being accumulated.

13. The gaming system server of claim 8, wherein when executed by the at least one processor, the plurality of instructions cause the at least one processor to:

(i) accumulate any secondary event triggering units associated with the play of the secondary event, (ii) modify an average expected payout of at least a portion of the play of the secondary event responsive to a second, different quantity of secondary event triggering units being accumulated, wherein said second quantity of secondary event triggering units are accumulated in association with at least one of: the play of the primary game, the play of the bonus game, and the play of the secondary event.

14. The gaming system server of claim 8, wherein at least one of: any determined primary game award, any determined bonus game award and any determined secondary event award is selected from the group of: a quantity of monetary credits, a quantity of non-monetary credits, a quantity of promotional credits, and a quantity of player tracking points.

15. A method of operating a gaming system, said method comprising:

receiving data associated with a wager placed in association with a play of a primary game, wherein a credit balance is decreasable based on the placed wager, said credit balance being increasable via an acceptor of a physical item associated with a monetary value, and said credit balance being decreasable via a cashout device configured to receive an input to cause an initiation of a payout associated with the credit balance, for the play of the primary game:

determining, by at least one processor, a primary game outcome, displaying, by at least one display device, the determined primary game outcome, determining, by the at least one processor, any primary game award associated with the determined primary game outcome, and displaying, by the at least one display device, any determined primary game award associated with the determined primary game outcome, said credit balance being increasable based on any determined primary game award associated with the determined primary game outcome, accumulating, by the at least one processor, any secondary event triggering units associated with the play of the primary game, responsive to a bonus game being triggered in association with the play of the primary game, for a play of the triggered bonus game:

determining, by the at least one processor, a bonus game outcome, displaying, by the at least one display device, the determined bonus game outcome, determining, by the at least one processor, any bonus game award associated with the determined bonus game outcome, and displaying, by the at least one display device, any determined bonus game award associated with the determined bonus game outcome, accumulating, by the at least one processor, any secondary event triggering units associated with the triggered play of the bonus game, independent of if a secondary event triggering unit is accumulated in association with the play of the primary game or in association with the triggered play of the bonus game, responsive to at least a first quantity of secondary event triggering units being accumulated, triggering, by the at least one processor, a play of a secondary event, and for the triggered play of the secondary event:

determining, by the at least one processor, a secondary event outcome, displaying, by the at least one display device, the determined secondary event outcome, determining, by the at least one processor, any secondary event award associated with the determined secondary event outcome, and displaying, by the at least one display device, any determined secondary event award associated with the determined secondary event outcome.

16. The method of claim 15, further comprising resetting, by the at least one processor, the quantity of accumulated secondary event triggering units prior to another wager being placed in association with another play of the primary game.

17. The method of claim 15, wherein at least one secondary event triggering unit is accumulated in association with at least one of the play of the primary game based on the displayed primary game outcome.

18. The method of claim 17, wherein at least one secondary event triggering unit is accumulated in association with at least one of the triggered play of the bonus game based on the displayed bonus game outcome.

19. The method of claim 15, further comprising:

triggering, by the at least one processor, a first play of the secondary event associated with a first average expected payout responsive to the first quantity of secondary event triggering units being accumulated, and (ii) triggering, by the at least one processor, a second play of the secondary event associated with a second, different average expected payout responsive to a second, different quantity of secondary event triggering units being accumulated.

20. The method of claim 15, further comprising:

accumulating, by the at least one processor, any secondary event triggering units associated with the play of the secondary event, (ii) modifying, by the at least one processor, an average expected payout of at least a portion of the play of the secondary event responsive to a second, different quantity of secondary event triggering units being accumulated, wherein said second quantity of secondary event triggering units are accumulated in association with at least one of: the play of the primary game, the play of the bonus game, and the play of the secondary event.

21. The method of claim 15, wherein at least one of: any determined primary game award, any determined bonus game award and any determined secondary event award is selected from the group of: a quantity of monetary credits, a quantity of non-monetary credits, a quantity of promotional credits, and a quantity of player tracking points.

22. The method of claim 15, which is provided through a data network.

23. The method of claim 22, wherein the data network is an internet.

* * * * *